(12) United States Patent
Goto et al.

(10) Patent No.: US 12,512,709 B2
(45) Date of Patent: Dec. 30, 2025

(54) ROTATING ELECTRIC MACHINE

(71) Applicant: HITACHI ASTEMO, LTD., Hitachinaka (JP)

(72) Inventors: Hideaki Goto, Hitachinaka (JP); Shigehisa Aoyagi, Hitachinaka (JP); Takaki Itaya, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 243 days.

(21) Appl. No.: 18/247,770

(22) PCT Filed: Aug. 31, 2021

(86) PCT No.: PCT/JP2021/031873
§ 371 (c)(1),
(2) Date: Apr. 4, 2023

(87) PCT Pub. No.: WO2022/085306
PCT Pub. Date: Apr. 28, 2022

(65) Prior Publication Data
US 2023/0336040 A1    Oct. 19, 2023

(30) Foreign Application Priority Data
Oct. 20, 2020   (JP) ................................. 2020-176188

(51) Int. Cl.
*H02K 1/27*   (2022.01)
*H02K 1/276*  (2022.01)
*H02K 1/32*   (2006.01)

(52) U.S. Cl.
CPC ............. *H02K 1/276* (2013.01); *H02K 1/32* (2013.01)

(58) Field of Classification Search
CPC ........ H02K 1/276; H02K 1/32; H02K 1/2766; H02K 9/19; Y02T 10/64
See application file for complete search history.

(56) References Cited

U.S. PATENT DOCUMENTS

| 2015/0115751 A1* | 4/2015 | Horii | H02K 1/32 |
| | | | 310/54 |
| 2019/0131837 A1* | 5/2019 | Miyaji | H02K 1/27 |
| 2023/0283125 A1* | 9/2023 | Hori | H02K 9/19 |
| | | | 310/61 |

FOREIGN PATENT DOCUMENTS

| JP | 2003061282 A | * | 2/2003 |
| JP | 2006-014399 A | | 1/2006 |
| JP | 2019-058048 A | | 4/2019 |

OTHER PUBLICATIONS

International Search Report with English Translation and Written Opinion of International Patent Application No. PCT/JP2021/031873 dated Oct. 26, 2021.

* cited by examiner

*Primary Examiner* — Thomas Truong
(74) *Attorney, Agent, or Firm* — Foley & Lardner LLP

(57) ABSTRACT

A rotating electric machine includes: a rotor core (22) that has magnet insertion holes (22b) (22c); permanent magnets (21) that are inserted into the magnet insertion holes (22b) (22c); and a groove (21cc) (21dc) that is formed in at least one of a plurality of non-magnetic pole surfaces (21c) (21d) of the permanent magnet (21) so as to allow a refrigerant (101) to flow through the groove (21cc) (21dc).

6 Claims, 13 Drawing Sheets

ROTATING ELECTRIC MACHINE

TECHNICAL FIELD

The present invention relates to a rotating electric machine provided with a permanent magnet.

BACKGROUND ART

In a rotating electric machine provided with a permanent magnet, it is known that the permanent magnet is demagnetized due to a magnetic field applied to the permanent magnet from the outside or a temperature change. In particular, in a rotating electric machine that has been developed in recent years and has a high power density with a small size and a large output, the permanent magnet has a high temperature due to a magnet loss accompanying the high power density, and demagnetization brought about by such a magnet loss gives rise to a problem.

In order to solve such a problem, PTL 1 discloses a method for suppressing demagnetization in such a manner where a through hole that penetrates a non-magnetic pole surface of a permanent magnet is formed in the permanent magnet, and a refrigerant is made to flow through the through hole thus cooling the permanent magnet.

CITATION LIST

Patent Literature

PTL 1: JP 2019-58048 A

SUMMARY OF INVENTION

Technical Problem

However, when a permanent magnet in which a through hole is formed is analyzed by a computer, it has been found that there is a high possibility that the permanent magnet is demagnetized in a portion sandwiched between an inner side surface of the through hole and a magnetic pole surface. That is, it has been found that, in a case where a through hole is formed in a permanent magnet, although the demagnetization due to a high temperature can be suppressed, there is a possibility that demagnetization will occur due to the shape of the permanent magnet.

It is an object of the present invention to provide a rotating electric machine capable of suppressing both the demagnetization of a permanent magnet inserted into a magnet insertion hole formed in a rotor core due to a high temperature of the permanent magnet, and the demagnetization of the permanent magnet due to the shape of the permanent magnet.

Solution to Problem

In order to achieve the above-mentioned object, the present invention provides a rotating electric machine that includes: a rotor core that has a magnet insertion hole; a magnet that is inserted into the magnet insertion hole; and a groove that is formed in at least one of a plurality of non-magnetic pole surfaces of the magnet so as to allow a refrigerant to flow through the groove.

Advantageous Effects of Invention

According to the present invention, it is possible to suppress both the demagnetization of a permanent magnet due to a high temperature of the permanent magnet and the demagnetization of the permanent magnet due to the shape of the rotating electric machine. Problems, configurations, and advantageous effects other than those described above will be clarified by the following description of embodiments.

DESCRIPTION OF EMBODIMENTS

Figure 1:
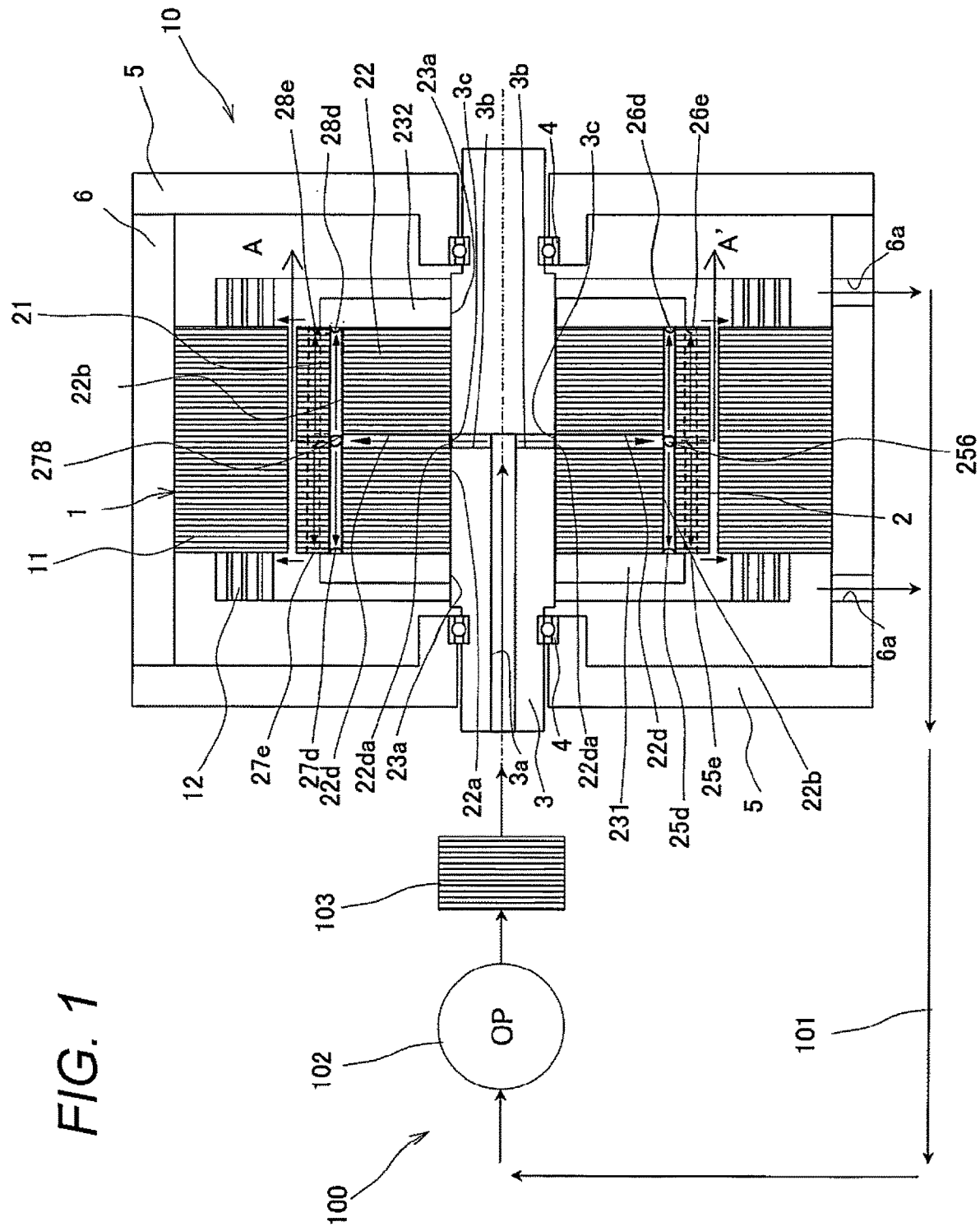
FIG. 1 is a cross-sectional view illustrating the schematic configuration of a rotating electric machine according to a first embodiment of the present invention.

Hereinafter, the description is made with respect to the configurations and the operations of rotating electric machines according to the first to eighth embodiments of the present invention with reference to drawings. In the respective drawings, the same reference numerals denote the same portions.

First Embodiment

FIG. 1 is a cross-sectional view illustrating the schematic configuration of a rotating electric machine 10 and a cooling system 100 according to a first embodiment of the present invention.

The rotating electric machine 10 according to the first embodiment of the present invention is a rotating electric machine having an interior permanent magnet (IPM) structure. As illustrated in FIG. 1, the rotating electric machine 10 includes a stator 1, a rotor 2, a shaft 3, bearings 4, end brackets 5, and a housing 6.

The stator 1 is an armature, and includes a stator core 11 and a coil 12. The stator core 11 is a cylindrical core formed by laminating electromagnetic steel plates, a plurality of teeth (not illustrated) are formed on an inner periphery of the stator core 11, and the coil 12 is wound around the plurality of teeth. The outer periphery of the stator core 11 is covered by a cylindrical housing 6, and the stator 1 is fixed to the housing 6.

The rotor 2 is a field magnet, is inserted into an internal space of the stator 1, and is rotatably mounted in the stator 1 with a predetermined gap formed between the stator 1 and the rotor 2. The rotor 2 includes a plurality of permanent magnets 21, a rotor core 22, and two end rings 23.

Figure 2:
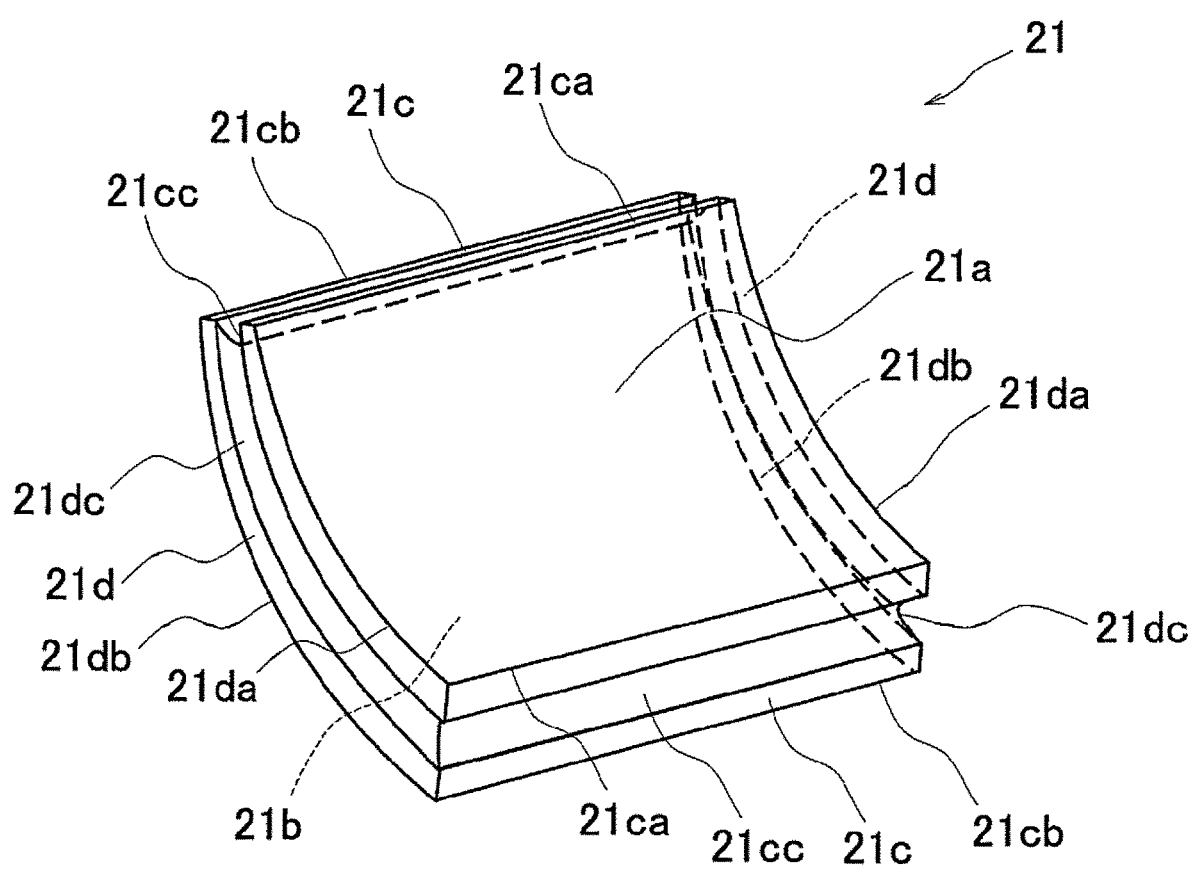
FIG. 2 is a perspective view of a permanent magnet according to the first embodiment of the present invention.

FIG. 2 is a perspective view of the permanent magnet 21 according to the first embodiment of the present invention. Each of the plurality of permanent magnets 21 is a so-called segment type magnet, and has a shape formed by bending a flat plate as illustrated in FIG. 2. That is, each permanent magnet 21 has a substantially annular sector cross section in the bent direction. Each permanent magnet 21 is magnetized in one direction in the thickness direction of the flat plate. The annular sector is a shape of a part of an annular region (also referred to as an annulus) surrounded by two concentric circles. That is, the annular sector is a part of the annular region that is sandwiched between two straight lines extending in the radial direction of two concentric circles. Therefore, each of the plurality of permanent magnets 21 has a curved concave surface 21a and a curved convex surface 21b, two rectangular surfaces 21c, and two annular sector surfaces 21d.

The curved concave surface 21a is a concave surface out of two curved surfaces of the permanent magnet 21. The curved convex surface 21b is a convex surface out of two curved surfaces of the permanent magnet 21. As described above, each of the plurality of permanent magnets 21 is magnetized in one direction in the thickness direction of the flat plate. Therefore, the curved concave surface 21a is a magnetic pole surface of either the S pole or the N pole, and the curved convex surface 21b is a magnetic pole surface having the pole opposite to the pole of the curved concave surface 21a. On the other hand, two rectangular surfaces 21c and two annular sector surfaces 21d are non-magnetic pole surfaces.

Each of two rectangular surfaces 21c is a rectangular flat surface located at an end in the circumferential direction of the permanent magnet 21, and includes a first groove 21cc. The first groove 21cc is a groove through which a refrigerant can flow. The first groove 21cc has a semicircular cross-sectional shape. Each of two rectangular surfaces 21c has a first intersection line 21ca that intersects with the curved concave surface 21a and a second intersection line 21cb that intersects with the curved convex surface 21b. The first groove 21cc is formed between the first intersection line 21ca and the second intersection line 21cb, and extends along both of the first intersection line 21ca and the second intersection line 21cb.

Each of two annular sector surfaces 21d is a plane having an annular sector shape and located at an end of the permanent magnet 21 in the axial direction, a second groove 21dc is formed on the annular sector surface 21d. The second groove 21dc is also a groove through which a refrigerant can flow. The second groove 21dc also has a semicircular cross-sectional shape substantially equal to the cross-sectional shape of the first groove 21cc. Each of two annular sector surfaces 21d has a first intersection line 21da that intersects with the curved concave surface 21a and a second intersection line 21db that intersects with the curved convex surface 21b. The second groove 21dc is formed between the first intersection line 21da and the second intersection line 21db, and extends along both the first intersection line 21da and the second intersection line 21db.

Figure 3:
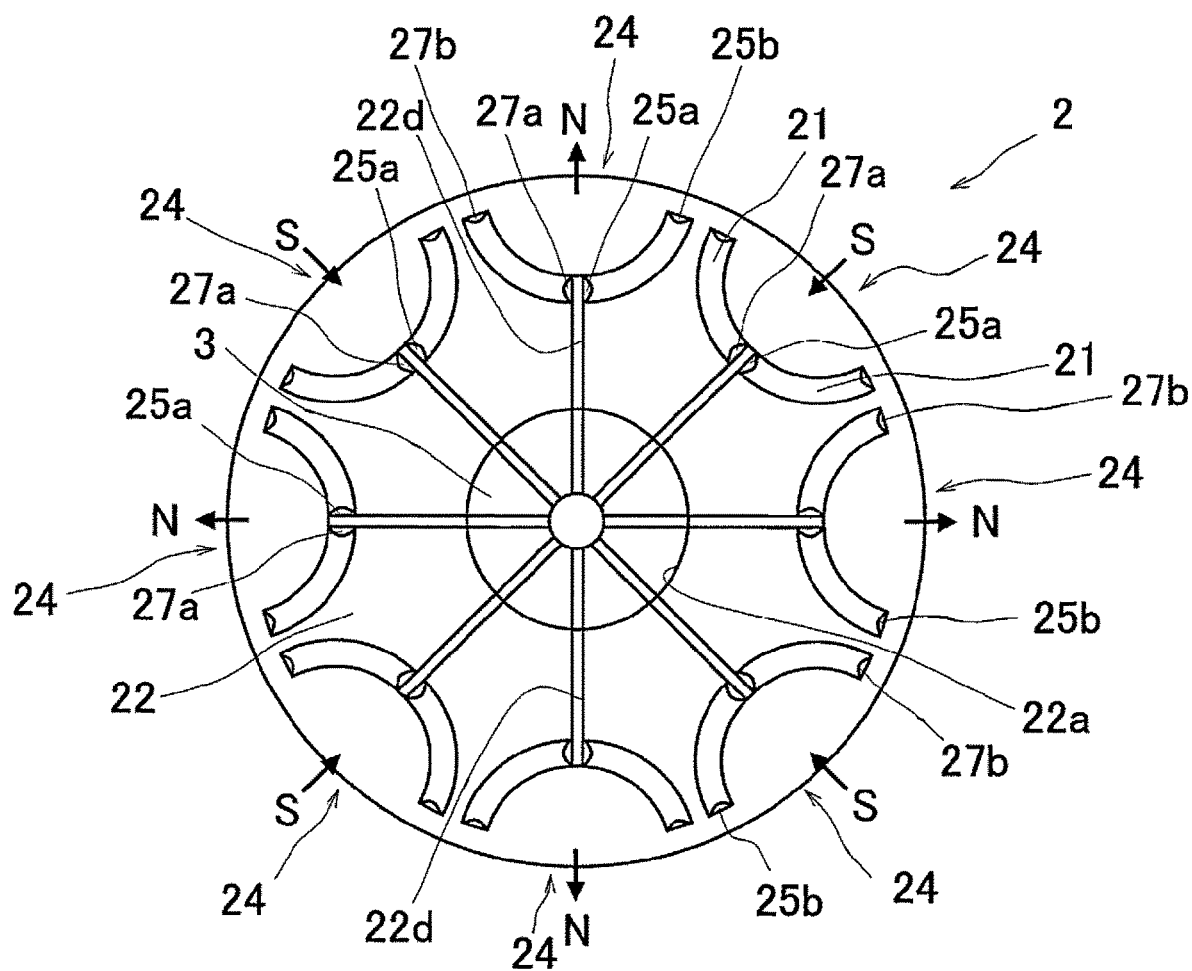
FIG. 3 is a cross-sectional view of a rotor and a shaft taken along line A-A' in FIG. 1.

FIG. 3 is a cross-sectional view of the rotor 2 and the shaft 3 taken along line A-A' in FIG. 1. Each of the plurality of permanent magnets 21 is embedded in the axial direction of the rotor core 22, and is arranged in the circumferential direction of the rotor core 22 as illustrated in FIG. 3. The permanent magnets 21 having the same polarity (N pole, S pole) of the curved concave surface 21a are arranged adjacently to each other on one side in the circumferential direction of the rotor core 22. With such a configuration, a plurality of magnetic poles 24 extending in the axial direction are formed on the outer circumferential surface of the rotor 2. The plurality of magnetic poles 24 are disposed at an equal interval in the circumferential direction of the rotor core 22, and two magnetic poles 24 disposed adjacently to each other in the circumferential direction of the rotor core 22 have different polarities.

Figure 4:
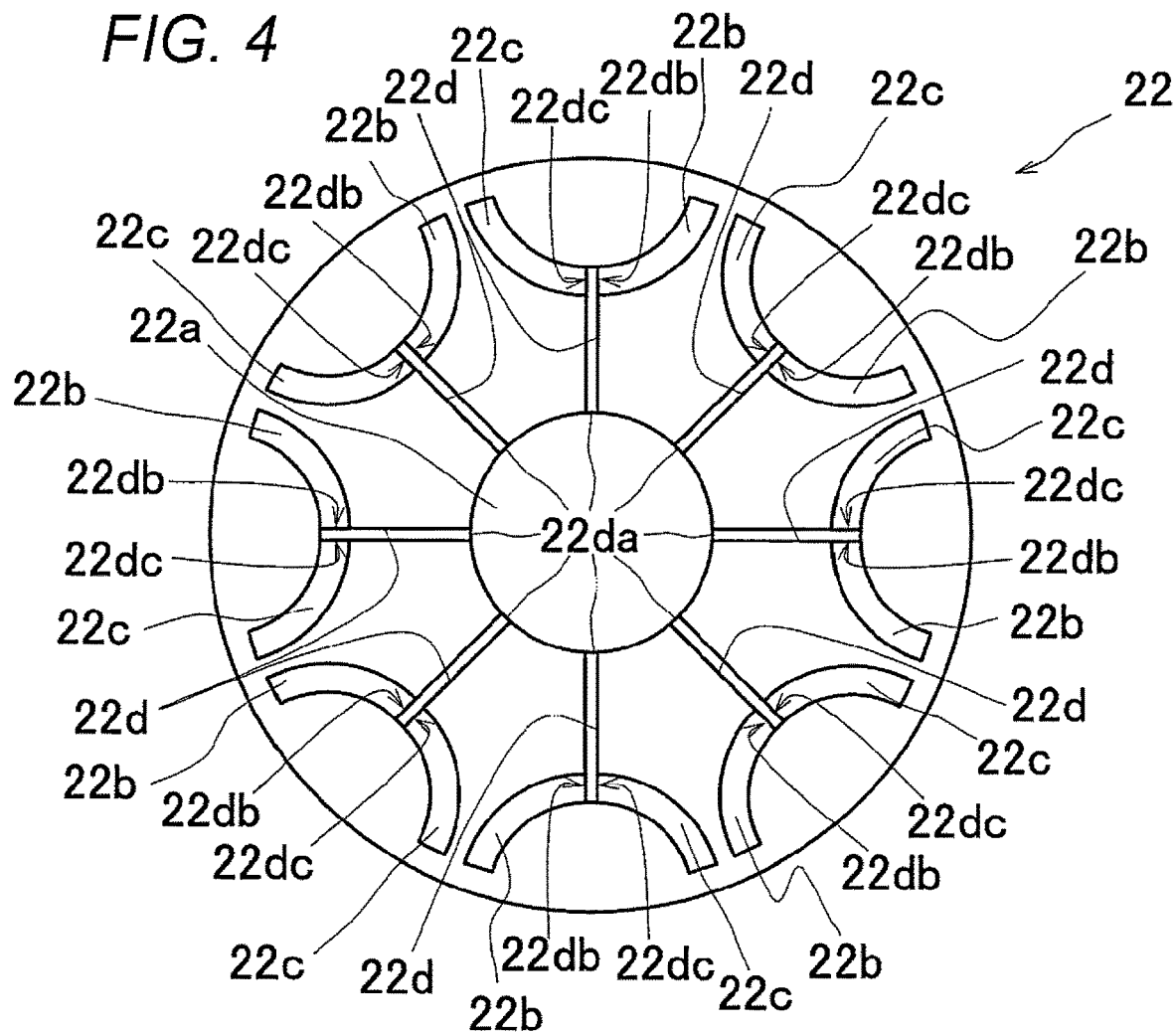
FIG. 4 is a cross-sectional view of a rotor core taken along line A-A' in FIG. 1.

FIG. 4 is a cross-sectional view of the rotor core 22 taken along line A-A' in FIG. 1. The rotor core 22 is a cylindrical core formed by stacking steel plates. As illustrated in FIG. 4, the rotor core 22 includes a shaft hole 22a, a plurality of first magnet insertion holes 22b, a plurality of second magnet insertion holes 22c, and a plurality of refrigerant circulation holes 22d.

The shaft hole 22a is a through hole formed on the central axis of the rotor core 22. As illustrated in FIG. 1 and FIG. 3, the shaft 3 is inserted into the shaft hole 22a, and the rotor core 22 is joined to the shaft 3 by interference fitting such as press fitting or shrink fitting.

Each of the plurality of first magnet insertion holes 22b and each of the plurality of second magnet insertion holes 22c are holes penetrating the rotor core 22 in the axial direction of the rotor core 22, and are alternately arranged in the circumferential direction of the rotor core 22.

Figure 5:
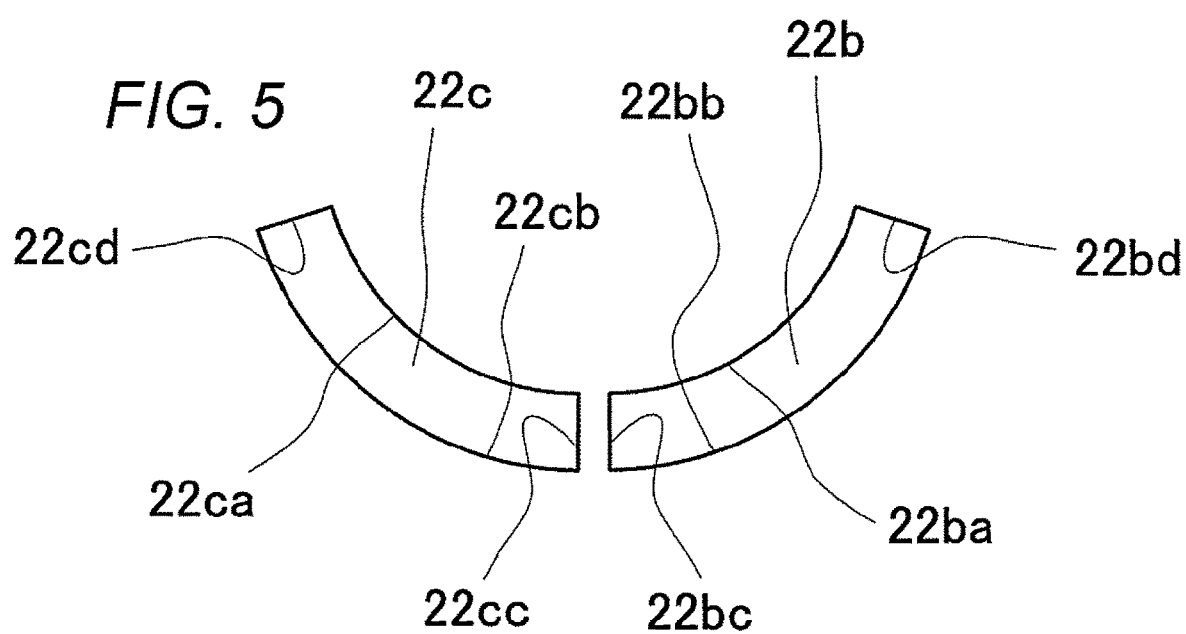
FIG. 5 is an enlarged view of one of a first magnet insertion hole and a second magnet insertion hole disposed adjacently to each other in the first embodiment according to the present invention as viewed from the axial direction of the rotor core.

FIG. 5 is an enlarged view of the first magnet insertion hole 22b and the second magnet insertion hole 22c disposed adjacently to each other in the first embodiment according to the present invention as viewed from the axial direction of the rotor core. The permanent magnets 21 having the same polarity of the curved concave surface 21a are inserted into the first magnet insertion hole 22b and the second magnet insertion hole 22c respectively. The permanent magnet 21 is fixed by a foamed adhesive agent applied to at least one of the curved concave surface 21a and the curved convex surface 21b of the permanent magnet 21.

The first magnet insertion hole 22b includes: a first inner side surface 22ba that faces the curved concave surface 21a of the permanent magnet 21; a second inner side surface 22*bb* that faces the curved convex surface 21*b* of the permanent magnet 21; a third inner side surface 22*bc* located on an inner diameter side of the rotor core 22 and forming one of two opposing inner peripheral surfaces of two rectangular surfaces 21*c* of the permanent magnet 21; and a fourth inner side surface 22*bd* located on an outer diameter side of the rotor core 22.

The second magnet insertion hole 22*c* includes: a first inner side surface 22*ca* that faces the curved concave surface 21*a* of the permanent magnet 21; a second inner side surface 22*cb* that faces the curved convex surface 21*b* of the permanent magnet 21; a third inner side surface 22*cc* located on an inner diameter side of the rotor core 22 and forming one of two opposing inner peripheral surfaces of two rectangular surfaces 21*c* of the permanent magnet 21; and a fourth inner side surface 22*cd* located on an outer diameter side of the rotor core 22.

As can be understood from FIG. 4 and FIG. 5, with respect to each of the plurality of first magnet insertion holes 22*b* and each of the plurality of second magnet insertion holes 22*c*, the first inner side surfaces 22*ba* and 22*ca* are arranged on an outer diameter side of the rotor core 22 such that the respective curved concave surface 21*a* of the plurality of permanent magnets 21 are arranged on the outer diameter side of the rotor core 22.

With respect to the first inner side surfaces 22*ba* and 22*ca* of the first magnet insertion hole 22*b* and the second magnet insertion hole 22*c* which are disposed adjacently to each other in the circumferential direction of the rotor core 22 and into which the permanent magnets 21 having the same poles on the curved concave surfaces 21*a* are inserted thus forming the magnetic poles 24 (hereinafter, referred to as the first magnet insertion hole 22*b* and the second magnet insertion hole 22*c* forming the magnetic poles 24), the respective normal lines of the inner side surfaces 22*ba* and 22*ca* of the first magnet insertion hole 22*b* and the second magnet insertion holes 22*c* forming the magnetic poles 24 intersect with each other on the outer diameter side of the rotor core 22. With such a configuration, in the rotating electric machine 10, the magnetic anisotropy of the plurality of magnetic poles 24 formed on the outer peripheral surface of the rotor 2 can be increased and hence, a reluctance torque can be increased.

As illustrated in FIG. 4, each of the plurality of refrigerant circulation holes 22*d* is a hole formed in an inner side surface of the shaft hole 22*a* of the rotor core 22. The refrigerant circulation holes 22*d* are formed so as to allow the shaft hole 22*a* to communicate with the first magnet insertion holes 22*b* and the second magnet insertion holes 22*c*. Specifically, each of the plurality of refrigerant circulation holes 22*d* extends in the radial direction of the rotor core 22 from the inner side surface of the shaft hole 22*a* formed in the rotor core 22, and form openings 22*db* and openings 22*dc* in the respective third inner side surfaces 22*bc*, 22*cc* of the first magnet insertion hole 22*b* and the second magnet insertion hole 22*c* that form the magnetic poles 24. The first magnet insertion holes 22*b* and the second magnet insertion holes 22*c* communicate with each other through these openings 22*db* and 22*dc* and the refrigerant circulation holes 22*d*.

Two end rings 23 are two circular plates that cover both ends of the rotor core 22. The end ring 23 on a side where a refrigerant inflow hole 3*a* described later is formed in the axial direction of the shaft 3 (hereinafter, the side being referred to as an inflow side) is referred to as an inflow-side end ring 231, and the end ring 23 on an opposite side (hereinafter, the side being referred to as an opposite-inflow-side) is referred to as an opposite-inflow-side end ring 232.

An outer diameter of the inflow-side end ring 231 is at least smaller than a distance between outer ends of the respective inflow-side second circumferential flow paths 25*d* and the inflow-side fourth circumferential flow paths 27*d* (see FIG. 3 and FIG. 7) in the radial direction of the rotor core 22 and the center of the rotor core 22. The outer diameter of the inflow-side end ring 231 is preferably equal to the shortest distance between the first grooves *cc* of inflow-side second axial flow paths 25*b* and the inflow-side fourth axial flow paths 27*b* described later and the center of the rotor core 22 in the radial direction of the rotor core 22. With such a configuration, when the inflow-side end ring 231 is mounted on both end surfaces of the rotor core, the end portions of the inflow-side second circumferential flow paths 25*d* and the inflow-side fourth circumferential flow paths 27*d* in the outer diameter direction of the rotor core 22 are exposed without being covered by the inflow-side end ring 231 so that the discharge ports 25*e* and 27*e* are formed (see FIG.

An outer diameter of the opposite-inflow-side end ring 232 is at least smaller than a distance between outer ends of the respective opposite-inflow-side second circumferential flow paths 26*d* and the opposite-inflow-side fourth circumferential flow paths 28*d* described later and the center of the rotor core 22. The outer diameter of the opposite-inflow-side end ring 232 is preferably equal to the shortest distance between the first grooves *cc* of the opposite-inflow-side second axial flow paths 26*b* and the opposite-inflow-side fourth axial flow paths 28*b* described later and the center of the rotor core 22 in the radial direction of the rotor core 22. With such a configuration, when the opposite-inflow-side end ring 232 is mounted on both end surfaces of the rotor core, the end portions of the opposite-inflow-side second circumferential flow paths 26*d* and the opposite-inflow-side fourth circumferential flow paths 28*d* in the outer diameter direction of the rotor core 22 are exposed without being covered by the opposite-inflow-side end ring 232 so that the discharge ports 26*e* and 28*e* are formed (see FIG. 1).

As illustrated in FIG. 1, a shaft hole 23*a* is formed in the inflow-side end ring 231 and the opposite-inflow-side end ring 232 respectively. The shaft hole 23*a* is a through hole that is formed at the center of the inflow-side end ring 231 and at the center of the opposite-inflow-side end ring 232 respectively. The inner diameter of the shaft hole 23*a* is larger than the outer diameter of the shaft 3. As illustrated in FIG. 1, the shaft 3 is inserted into the shaft hole 23*a*.

Figure 6:
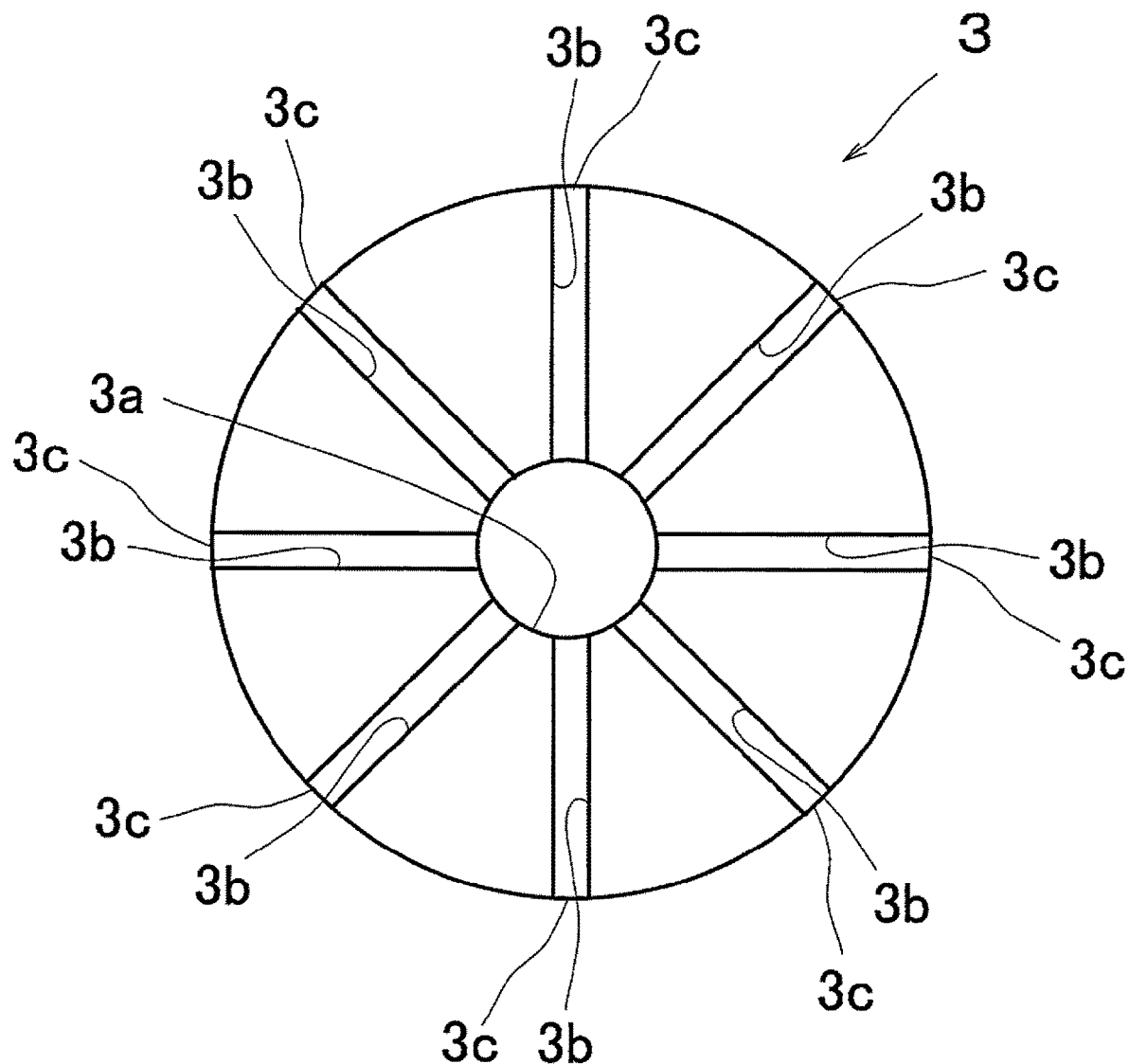
FIG. 6 is a cross-sectional view of the shaft taken along line A-A' in FIG. 1.

FIG. 6 is a cross-sectional view of the shaft taken along line A-A' in FIG. 1. As illustrated in FIG. 1, the shaft 3 is a rotating shaft that is rotatably supported by two bearings 4 and rotates together with the rotor core 22 which is joined to the shaft 3. As illustrated in FIG. 6, a refrigerant inflow hole 3*a* and a plurality of refrigerant circulation holes 3*b* are formed in the shaft 3.

The refrigerant inflow hole 3*a* is a hole formed in the shaft 3 at the center of one end surface of the shaft 3 along the center axis, and communicates with each of the plurality of refrigerant circulation holes 3*b*.

Each of the plurality of refrigerant flow holes 3*b* extends from an inner peripheral surface of the refrigerant inflow hole 3*a* in the outer diameter direction of the shaft 3, and penetrate an outer peripheral surface of the shaft 3. Each of the plurality of openings 3*c* formed on the outer peripheral surface of the shaft 3 by each of the plurality of refrigerant circulation holes 3*b* overlaps with the plurality of openings 22*da* (see FIG. 4) formed on the inner side surface of the shaft hole 22*a* by each of the plurality of refrigerant circulation holes 22*d* formed in the rotor core 22. With such a configuration, as illustrated in FIG. 3, each of the plurality of refrigerant circulation holes 3*b* formed in the shaft 3 communicate with each of the plurality of refrigerant circulation holes 22*d* formed in the rotor core 22.

As illustrated in FIG. 1, two bearings 4 are respectively formed of a radial ball bearing. These bearings 4 are fixed to two end brackets 5 respectively. The bearing 4 is not limited to a radial ball bearing, and may be a radial roller bearing, for example. Two end brackets 5 are disk-shaped parts. The end brackets 5 are mounted on end portions of the housing 6 so as to close openings of the housing 6.

The housing 6 is a cylindrical rigid body that covers and fixes the stator 1. One or more (two in FIG. 1) refrigerant discharge holes 6*a* that penetrate a side surface of the housing 6 are formed in the side surface of the housing 6. As illustrated in FIG. 1, one or more refrigerant discharge holes 6*a* are disposed below the installed rotating electric machine 10.

The rotating electric machine 10 having such a configuration becomes electric motor that outputs a torque from the shaft 3 when electricity is supplied to the stator 1, and becomes a generator that outputs electricity from the stator 1 when a rotational force is inputted to the shaft 3.

The cooling system 100 is a cooling system that suppresses the demagnetization of the permanent magnet 21 by cooling the permanent magnet 21. The cooling system 100 includes a refrigerant 101, an oil pump 102 that feeds the refrigerant 101 toward the rotating electric machine 10, and an oil cooler 103 that cools the refrigerant 101. As the refrigerant 101, oil, particularly, automatic oil (ATF) is used.

Figure 7:
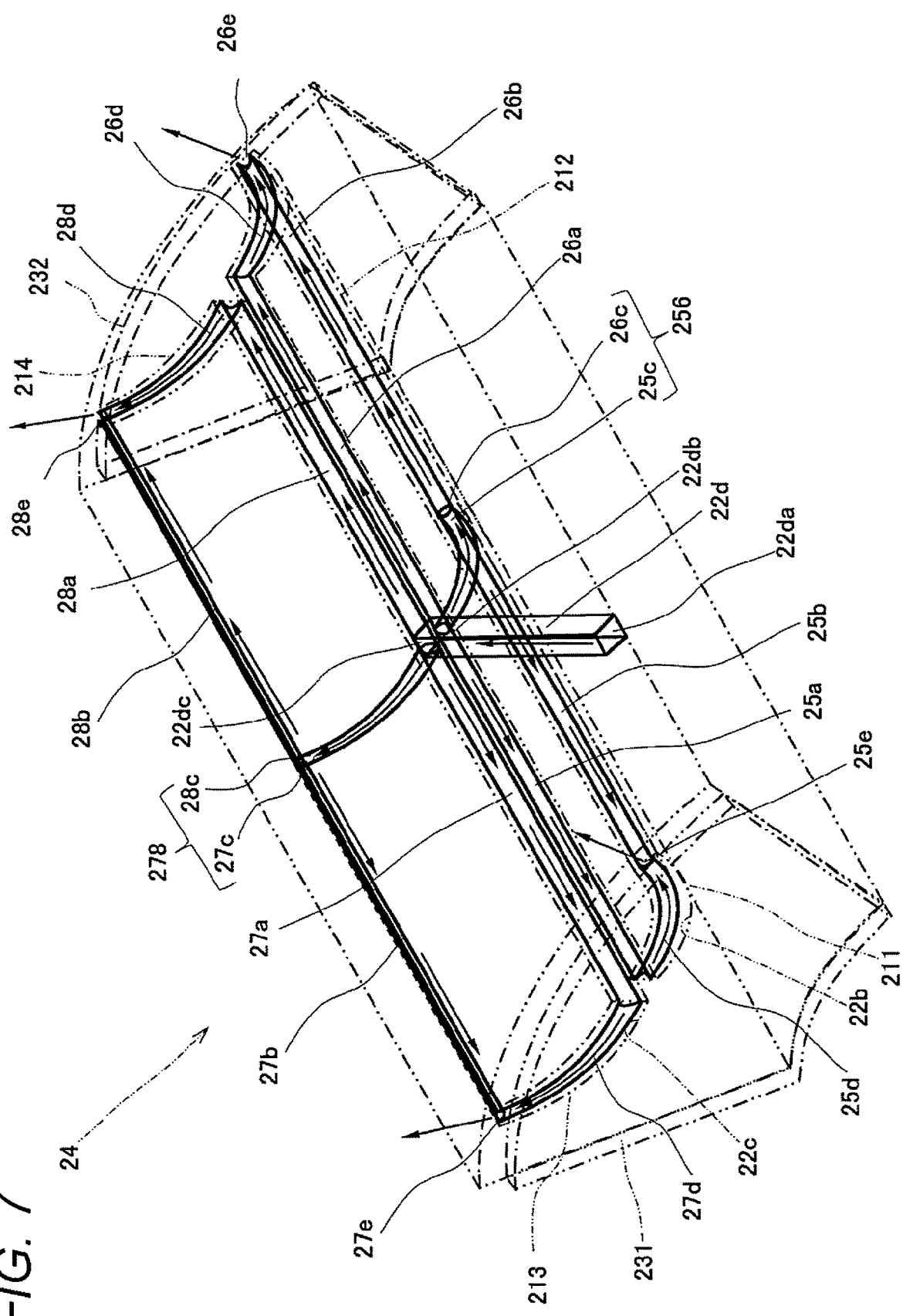
FIG. 7 is a perspective view illustrating the configuration of a flow path for a refrigerant in one of a plurality of magnetic poles of the rotor according to the first embodiment of the present invention.

FIG. 7 is a perspective view illustrating the configuration of a flow path for the refrigerant 101 in one of the plurality of magnetic poles 24 of the rotor 2 according to the first embodiment of the present invention. Hereinafter, the flow path illustrated in FIG. 7 will be described in detail with reference to FIG. 2 and FIG. 5.

The first permanent magnet 211 is inserted in the first magnet insertion hole 22*b* on the inflow side, and the second permanent magnet 212 is inserted in the first magnet insertion hole 22*b* on the opposite inflow side. The inflow-side first axial flow paths 25*a* are formed between two first grooves 21*cc* of the first permanent magnet 211 and the third inner side surfaces 22*bc* of the first magnet insertion hole 22*b*. The inflow-side second axial flow paths 25*b* are formed between two first grooves 21*cc* of the first permanent magnet 211 and the fourth inner side surfaces 22*bd* of the first magnet insertion hole 22*b*.

On the other hand, the opposite-inflow-side first axial flow paths 26*a* are formed between two first grooves 21*cc* of the second permanent magnet 212 and the third inner side surfaces 22*bc* of the first magnet insertion hole 22*b*. The opposite-inflow-side second axial flow paths 26*b* are formed between two first grooves 21*cc* of the second permanent magnet 212 and the fourth inner side surfaces 22*bd* of the first magnet insertion hole 22*b*.

The inflow-side first circumferential flow paths 25*c* are formed between two second grooves 21*dc* of the first permanent magnet 211 and the annular sector surfaces 21*d* of the second permanent magnet 212 that face two second grooves 21*dc* of the first permanent magnet 211 in the axial direction of the rotor core 22. The inflow-side second circumferential flow paths 25*d* are formed between two second grooves 21*dc* of the first permanent magnet 211 and surfaces of the inflow-side end rings 231 that face the rotor core 22.

On the other hand, the opposite-inflow-side first circumferential flow paths 26*c* are formed between two second grooves 21*dc* of the second permanent magnet 212 and the annular sector surfaces 21*d* of the first permanent magnet 211 that face two second grooves 21*dc* of the second permanent magnet 212 in the axial direction of the rotor core 22. The opposite-inflow-side second circumferential flow paths 26*d* are formed between two second grooves 21*dc* of the second permanent magnet 212 and surfaces of the opposite-inflow-side end rings 232 that face the rotor core 22.

In this embodiment, the inflow-side first circumferential flow path 25*c* and the opposite-inflow-side first circumferential flow path 26*c* face each other, and the inflow-side first circumferential flow path 25*c* and the opposite-inflow-side first circumferential flow path 26*c* form one flow path (first circumferential flow path 25*b*).

The third permanent magnet 213 is inserted in the second magnet insertion hole 22*c* on the inflow side, and the fourth permanent magnet 214 is inserted in the second magnet insertion hole 22*c* on the opposite inflow side. The inflow-side third axial flow paths 27*a* are formed between two first grooves 21*cc* of the third permanent magnet 213 and the third inner side surfaces 22*cc* of the second magnet insertion hole 22*c*. The inflow-side fourth axial flow paths 27*b* are formed between two first grooves 21*cc* of the third permanent magnet 213 and the fourth inner side surfaces 22*cd* of the second magnet insertion hole 22*c*.

On the other hand, the opposite-inflow-side third axial flow paths 28*a* are formed between two first grooves 21*cc* of the fourth permanent magnet 214 and the third inner side surfaces 22*cc* of the second magnet insertion hole 22*c*. The opposite-inflow-side fourth axial flow paths 28*b* are formed between two first grooves 21*cc* of the fourth permanent magnet 214 and the fourth inner side surfaces 22*cd* of the second magnet insertion hole 22*c*.

The inflow-side third circumferential flow paths 27*c* are formed between two second grooves 21*dc* of the third permanent magnet 213 and the annular sector surfaces 21*d* of the fourth permanent magnet 214 that face two second grooves 21*dc* of the third permanent magnet 213 in the axial direction of the rotor core 22. The inflow-side fourth circumferential flow paths 27*d* are formed between two second grooves 21*dc* of the third permanent magnet 213 and surfaces of the inflow-side end rings 231 that face the rotor core 22.

On the other hand, the opposite-inflow-side third circumferential flow paths 28*c* are formed between two second grooves 21*dc* of the fourth permanent magnet 214 and the annular sector surfaces 21*d* of the third permanent magnet 213 that face two second grooves 21*dc* of the fourth permanent magnet 214 in the axial direction of the rotor core 22. The opposite-inflow-side fourth circumferential flow paths 28*d* are formed between two second grooves 21*dc* of the fourth permanent magnet 214 and surfaces of the opposite-inflow-side end rings 232 that face the rotor core 22.

In the same manner as the first magnet insertion hole 22*b*, in this embodiment, the inflow-side third circumferential flow path 27*c* and the opposite-inflow-side third circumferential flow path 28*c* face each other, and the inflow-side third circumferential flow path 27*c* and the opposite-inflow-side third circumferential flow path 28*c* form one flow path (third circumferential flow path 27*b*).

Next, the flow of the refrigerant 101 will be described with reference to the drawings. In FIG. 1 and FIG. 7, the flow of the refrigerant 101 is indicated by an arrow.

As illustrated in FIG. 1, the refrigerant 101 that is supplied from the oil pump 102 of the cooling system 100 and is cooled by the oil cooler 103 is supplied to the refrigerant inflow hole 3a formed in the shaft 3 of the rotating electric machine 10.

The refrigerant 101 supplied to the refrigerant inflow hole 3a is supplied from the refrigerant inflow hole 3a to each of the plurality of refrigerant circulation holes 3b. The refrigerant 101 supplied to the respective refrigerant circulation holes 3b flows through the respective refrigerant circulation holes 3b, and is supplied to each of the plurality of openings 22da (see FIG. 4, FIG. 7) formed on an inner side surface of the shaft hole 22a formed in the rotor core 22 from each of the plurality of openings 3c formed on the outer peripheral surface of the shaft 3.

As illustrated in FIG. 4 and FIG. 7, the refrigerant 101 that is supplied to each of the plurality of openings 22da flows through each of the plurality of refrigerant circulation holes 22d formed in the rotor core 22, and is supplied to the openings 22db, 22dc formed on the respective third inner side surfaces 22bc, 22cc of the first magnet insertion hole 22b and the second magnet insertion hole 22c.

The refrigerant 101 supplied to the opening 22db is supplied to the inflow-side first axial flow path 25a, the opposite-inflow-side first axial flow path 26a, and the first circumferential flow path 256 that communicate with the opening 22db.

The refrigerant 101 supplied to the inflow-side first axial flow path 25a is supplied to the inflow-side second circumferential flow path 25d while cooling the first groove 21cc of the first permanent magnet 211. The refrigerant 101 supplied to the inflow-side second circumferential flow path 25d cools the second groove 21dc of the first permanent magnet 211, and is discharged from the discharge port 25e toward the coil 12.

The refrigerant 101 supplied to the opposite-inflow-side first axial flow path 26a is supplied to the opposite-inflow-side second circumferential flow path 26d while cooling the first groove 21cc of the second permanent magnet 212. The refrigerant 101 supplied to the opposite-inflow-side second circumferential flow path 26d cools the second groove 21dc of the second permanent magnet 212, and is discharged from the discharge port 26e toward the coil 12.

The refrigerant 101 supplied to the first circumferential flow path 256 is supplied to the inflow-side second axial flow path 25b and the opposite-inflow-side second axial flow path 26b while cooling the first groove 21cc of the first permanent magnet 211 and the first groove 21cc of the second permanent magnet 212. The refrigerant 101 supplied to the inflow-side second axial flow path 25b cools the first groove 21cc of the first permanent magnet 211, and is discharged from the discharge port 25e toward the coil 12. The refrigerant 101 supplied to the opposite-inflow-side second axial flow path 26b cools the first groove 21cc of the second permanent magnet 212, and is discharged from the discharge port 26e toward the coil 12.

The refrigerant 101 supplied to the opening 22dc is supplied to the inflow-side third axial flow path 27a, the opposite-inflow-side third axial flow path 28a, and the third circumferential flow path 278 that communicate with the opening 22dc.

The refrigerant 101 supplied to the inflow-side third axial flow path 27a is supplied to the inflow-side fourth circumferential flow path 27d while cooling the first groove 21cc of the third permanent magnet 213. The refrigerant 101 supplied to the inflow-side fourth circumferential flow path 27d cools the second groove 21dc of the third permanent magnet 213, and is discharged from the discharge port 27e toward the coil 12.

The refrigerant 101 supplied to the opposite-inflow-side third axial flow path 28a is supplied to the opposite-inflow-side fourth circumferential flow path 28d while cooling the first groove 21cc of the fourth permanent magnet 214. The refrigerant 101 supplied to the opposite-inflow-side fourth circumferential flow path 28d cools the second groove 21dc of the fourth permanent magnet 214, and is discharged from the discharge port 28e toward the coil 12.

The refrigerant 101 supplied to the third circumferential flow path 278 is supplied to the inflow-side fourth axial flow path 27b and the opposite-inflow-side fourth axial flow path 28b while cooling the first groove 21cc of the third permanent magnet 213 and the fourth permanent magnet 214. The refrigerant 101 supplied to the inflow-side fourth axial flow path 27b cools the first groove 21cc of the third permanent magnet 213, and is discharged from the discharge port 27e toward the coil 12. The refrigerant 101 supplied to the opposite-inflow-side fourth axial flow path 28b cools the first groove 21cc of the fourth permanent magnet 214, and is discharged from the discharge port 28e toward the coil 12.

The refrigerant 101 that is discharged from the respective discharge ports 25e to 28e toward the coil 12 cools the coil 12. After cooling the coil 12, the refrigerant 101 is discharged to the outside of the rotating electric machine 10 through one or more refrigerant discharge holes 6a formed in the housing 6. Then, the refrigerant 101 circulates through the cooling system 100, and is again supplied to the refrigerant inflow hole 3a formed in the shaft 3 of the rotating electric machine 10.

Figure 8:
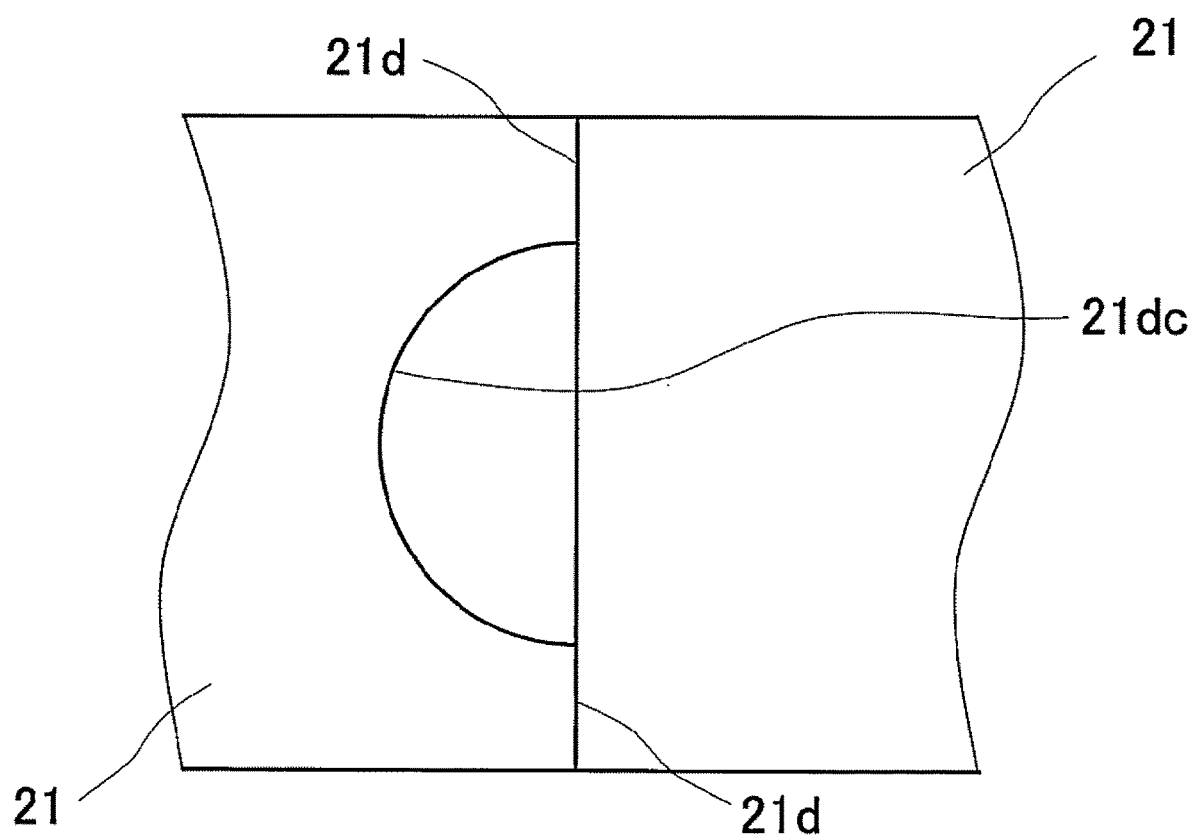
FIG. 8 is a partial cross-sectional view of a permanent magnet according to another embodiment of the present invention.

In the present embodiment, the inflow-side first circumferential flow path 25c and the opposite-inflow-side first circumferential flow path 26c face each other. The inflow-side first circumferential flow path 25c and the opposite-inflow-side first circumferential flow path 26c form one flow path (the first circumferential flow path 256). The inflow-side third circumferential flow path 27c and the opposite-inflow-side third circumferential flow path 28c face each other, and the inflow-side third circumferential flow path 27c and the opposite-inflow-side third circumferential flow path 28c form one flow path (the third circumferential flow path 278). However, the rotating electric machine 10 may not include either the inflow-side first circumferential flow path 25c or the opposite-inflow-side first circumferential flow path 26c. Alternatively, the rotating electric machine 10 may not include either the inflow-side third circumferential flow path 27c or the opposite-inflow-side third circumferential flow path 28c. That is, as illustrated in FIG. 8, either one of the annular sector surfaces 21d of two permanent magnets 21 disposed adjacently to each other in the axial direction of the rotor core 22 may include the second groove 21dc.

(Advantageous Effects)

The rotating electric machine 10 according to the first embodiment described above includes the rotor core 22 having the magnet insertion holes (the first magnet insertion hole 22b and the second magnet insertion holes 22c), the permanent magnets 21 inserted into the magnet insertion holes (the first magnet insertion holes 22b and the second magnet insertion holes 22c), and the grooves (the first grooves 21cc and the second grooves 21dc) formed on at least one of the plurality of non-magnetic pole surfaces (two rectangular surfaces 21c and two annular sector surfaces 21d) of the permanent magnet 21 and through which the refrigerant 101 can flow. With such a configuration, the permanent magnet 21 can be cooled by making the refrigerant 101 flow through the grooves and hence, the demagnetization due to a high temperature of the permanent magnet 21 can be suppressed.

Figure 9:
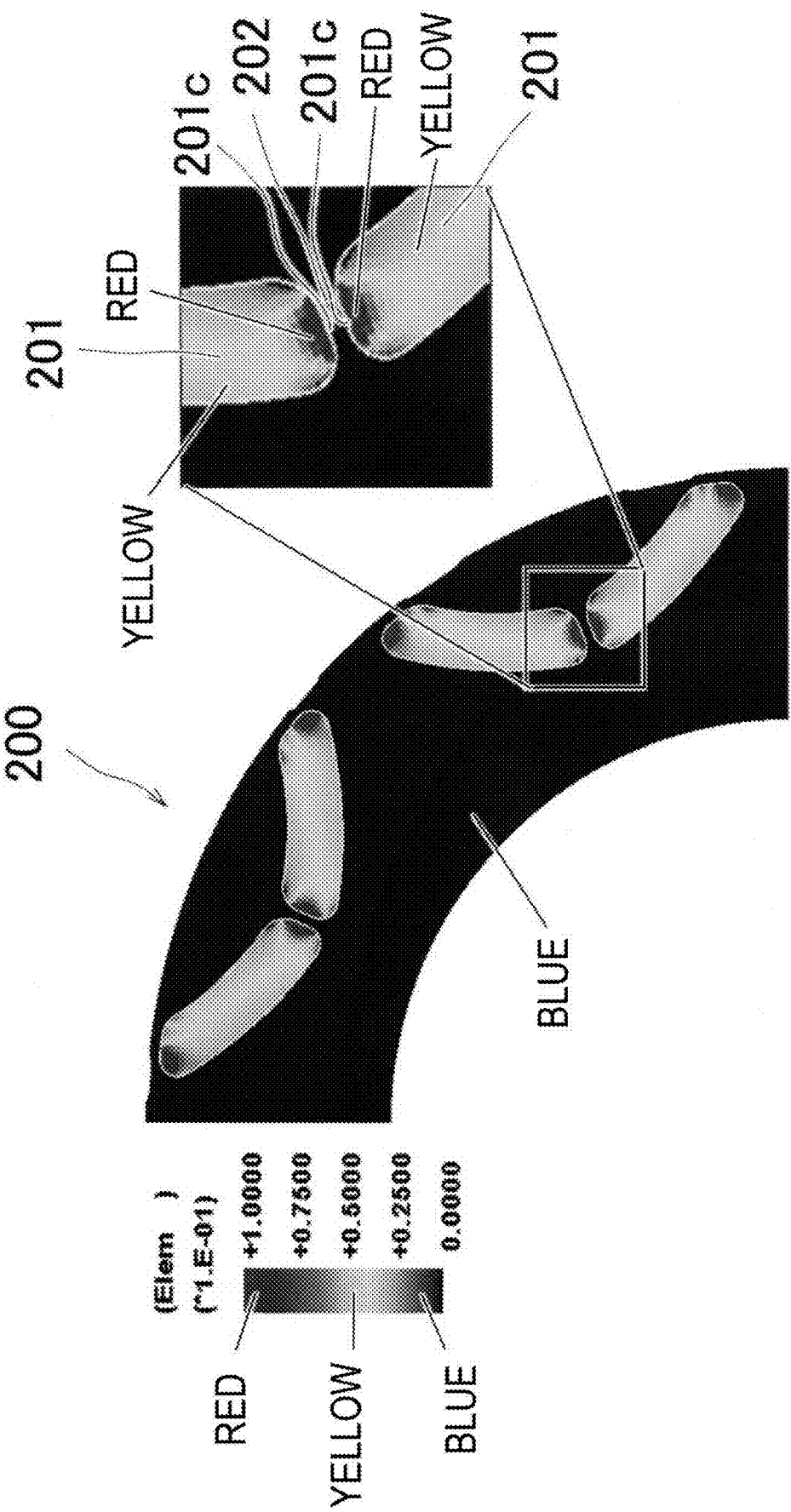
FIG. 9 is a cross-sectional analysis view obtained by analyzing a portion of a permanent magnet according to a comparative example that is easily demagnetized using a computer.

FIG. 9 is a cross-sectional analysis view obtained by analyzing a portion of a rotor 200 according to a comparative example that is easily demagnetized using a computer, and by illustrating the ease of demagnetization by distribution of colors. It must be noted that the ease of demagnetization increases in the order of blue→yellow→red. Further, on a permanent magnet 201 of a rotor 200 according to the comparative example, a groove is not formed on a non-magnetic pole surface 201c.

In the permanent magnet 201 of the rotor 200 according to the comparative example, as illustrated in FIG. 8, a center portion of a cross section of the non-magnetic pole surface 201c is tinted in red so that the center portion is easily demagnetized. On the other hand, in the permanent magnet 21 of the rotating electrical machine 10 according to the present embodiment, the groove through which the refrigerant 101 can flow (the first groove 21cc and the second groove 21dc) is formed on at least one of the plurality of non-magnetic pole surfaces (two rectangular surfaces 21c and two annular sector surfaces 21d) of the permanent magnet 21. That is, at the center of the cross section of the non-magnetic pole surface analyzed to be easily demagnetized in the permanent magnet 201 according to the comparative example, as illustrated in FIG. 2, the grooves (the first groove 21cc and the second groove 21dc) are formed. Accordingly, the demagnetization due to the shape of the permanent magnet 21 can be suppressed. With such a configuration, the demagnetization due to heat generation can be suppressed without reducing the volume (the effective volume of the magnet) of the permanent magnet 21 that is not demagnetized and contributes to a torque.

Further, in the rotor 200 according to the comparative example, a leakage magnetic flux is likely to occur in a bridge 202 of the rotor core that is brought into contact with the non-magnetic pole surface 201c of the permanent magnet 201. In the rotor 2 according to the present embodiment, the grooves (the first groove 21cc and the second groove 21dc) are formed on at least one of the plurality of non-magnetic pole surfaces (two rectangular surfaces 21c and two annular sector surfaces 21d) that are terminal portions of the permanent magnet 21 so that gaps are formed between the plurality of non-magnetic pole surfaces and the rotor core 22. This gap can suppress the generation of a leakage magnetic flux.

In the rotating electrical machine 10 of the present embodiment, the grooves (first grooves 21 cc) through which the refrigerant 101 can flow are formed in at least one of the non-magnetic pole surfaces (two rectangular surfaces 21c) that face the inner side surfaces (the third inner side surfaces 22bc, 22cc and the fourth inner side surfaces 22bd, 22cd) of the first magnet insertion hole 22b and the second magnet insertion hole 22c among the plurality of non-magnetic pole surfaces of the permanent magnet 21. With such a configuration, the flow paths formed by the first groove 21cc and the third inner side surfaces 22bc, 22cc of the permanent magnet 21 (the inflow-side first axial flow path 25a, the opposite-inflow-side first axial flow path 26a, the inflow-side third axial flow path 27a, the opposite-inflow side third axial flow path 28a illustrated in FIG. 7) can efficiently cool the heat accumulated on the inner diameter side of the rotor 2, and the demagnetization due to a high temperature of the permanent magnet 21 can be suppressed. With such a configuration, the flow paths formed by the first groove 21cc and the fourth inner side surfaces 22bd, cd of the permanent magnet 21 (the inflow-side second axial flow path 25b, the opposite-inflow-side second axial flow path 26b, the inflow-side fourth axial flow path 27b, the opposite-inflow side fourth axial flow path 28b illustrated in FIG. 7) can efficiently cool the elevation of heat by harmonics generated on the outer diameter side of the rotor 2 and hence, the demagnetization due to a high temperature of the permanent magnet 21 can be suppressed.

In the rotating electric machine 10 of the present embodiment, the permanent magnets 21 are the plurality of permanent magnets 21 that are inserted into the magnet insertion holes (the first magnet insertion hole 22b and the second magnet insertion hole 22c) and are arranged in the axial direction of the rotor core 22, and the grooves through which the refrigerant can flow are formed on at least one of the non-magnetic pole surfaces (two annular sector surfaces 21d) that face each other in two permanent magnets 21 disposed adjacently to each other among the plurality of non-magnetic pole surfaces (two rectangular surfaces 21c and two annular sector surfaces 21d). With respect to two permanent magnets that are disposed adjacently to each other in the plurality of permanent magnets 21, the non-magnetic pole surfaces (two annular sector surfaces 21d) that face each other are disposed inside the rotor 2 and hence, heat is liable to be accumulated as compared with the outside of the rotor 2. However, with the provision of the configuration described above, the non-magnetic pole surfaces can be cooled by the refrigerant 101.

Second Embodiment

Figure 10:
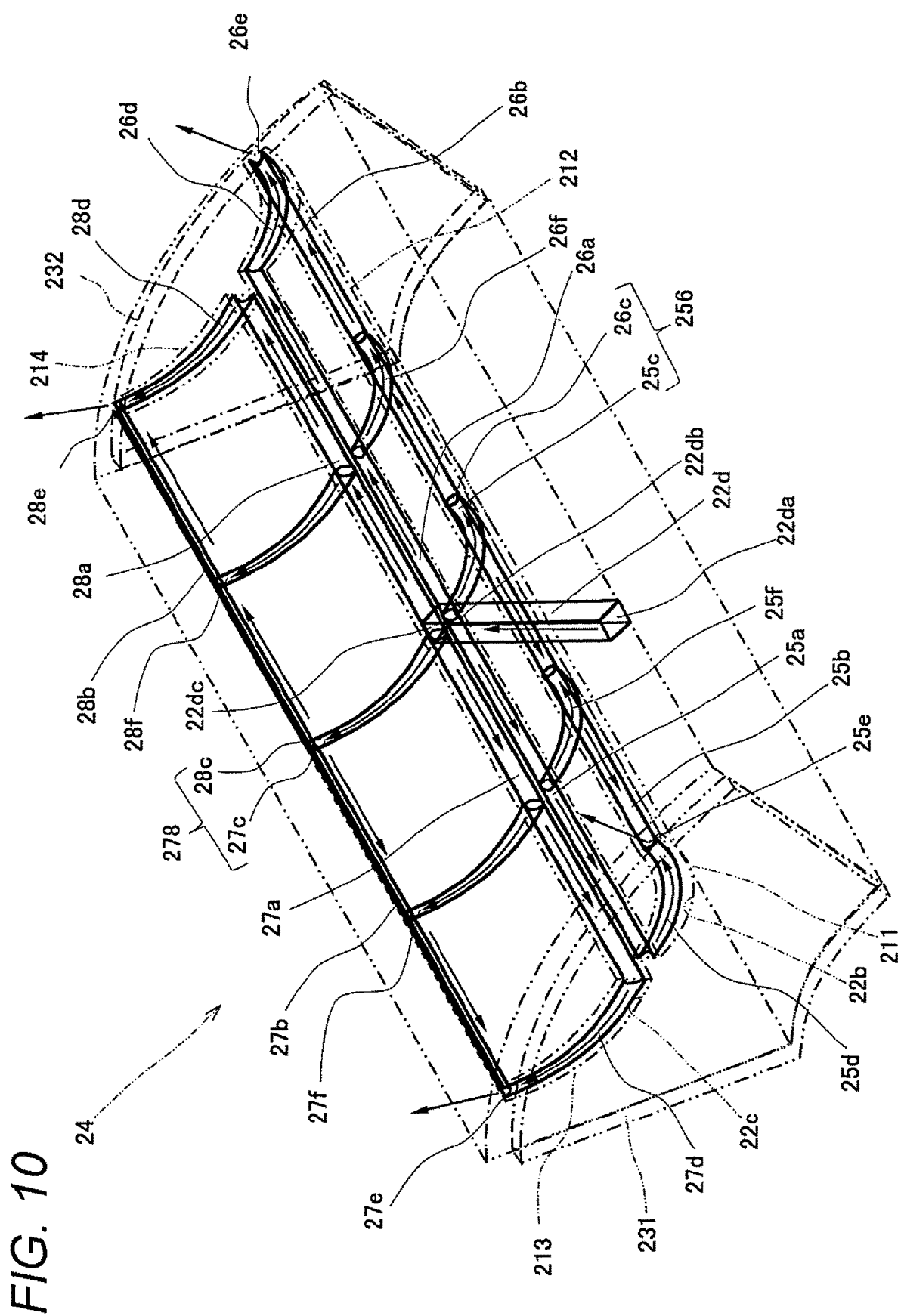
FIG. 10 is a perspective view illustrating the configuration of a flow path for a refrigerant in one of a plurality of magnetic poles of a rotor according to a second embodiment of the present invention.

FIG. 10 is a perspective view illustrating the configuration of a flow path for a refrigerant 101 in one of a plurality of magnetic poles 24 of a rotor 2 according to a second embodiment of the present invention.

The rotor 2 according to the present embodiment differs from the rotor 2 according the first embodiment with respect to the following point. In this embodiment, a first rotor core 221 and a second rotor core 222 that are inserted into a first magnet insertion hole 22b, and a third rotor core 223 and a fourth rotor core 224 that are inserted into a second magnet insertion hole 22c are respectively divided in the axial direction of a rotor core 22. That is, in the first embodiment, two permanent magnets 21 are inserted into the first magnet insertion hole 22b and the second magnet insertion hole 22c respectively in the axial direction of the rotor core 22. On the other hand, with respect to the rotor 2 of the present embodiment, four permanent magnets 21 are inserted into the first magnet insertion hole 22b and the second magnet insertion hole 22c respectively in the axial direction of the rotor core 22.

With such a configuration, in the present embodiment, the flow path for the refrigerant 101 includes, in addition to the flow path of the refrigerant 101 of the first embodiment, the following flow paths in the axial direction of the rotor core 22. That is, in this embodiment, the flow path further includes: an inflow-side fifth circumferential flow path 25f formed between a first circumferential flow path 256 and an inflow-side second circumferential flow path 25d; an opposite-inflow-side fifth circumferential flow path 26f formed between the first circumferential flow path 256 and an opposite-inflow-side second circumferential flow path 26d; an inflow-side sixth circumferential flow path 27f formed between a third circumferential flow path 278 and an inflow-side fourth circumferential flow path 27d; and an opposite-inflow-side sixth circumferential flow path 28f formed between the third circumferential flow path 278 and an opposite-inflow-side fourth circumferential flow path 28d.

In the present embodiment, an example has been described where a refrigerant circulation hole 22d is formed between the first circumferential flow path 256 and the third circumferential flow path 278. However, the present invention is not limited to this embodiment. The refrigerant circulation hole 22d may be formed between the inflow-side fifth circumferential flow path 25f and the inflow-side sixth circumferential flow path 27f or between the opposite-inflow-side fifth circumferential flow path 26f and the opposite-inflow-side sixth circumferential flow path 28f.

Further, in the present embodiment, the example is described where four permanent magnets 21 are inserted into the first magnet insertion hole 22b and the second magnet insertion hole 22c respectively in the axial direction of the rotor core 22. However, the present invention is not limited to this embodiment. The number of permanent magnets 21 that differs from the number of permanent magnets 21 used in the above embodiment may be inserted into the first magnet insertion hole 22b and the second magnet insertion hole 22c respectively in the axial direction of the rotor core 22.

(Advantageous Effects)

The rotor 2 according to the present embodiment includes in addition to the flow path for the refrigerant 101 in the first embodiment, the inflow-side fifth circumferential flow path 25f, the opposite-inflow-side fifth circumferential flow path 26f, the inflow-side sixth circumferential flow path 27f, and the opposite-inflow-side sixth circumferential flow path 28f. Therefore, the rotor 2 according to the present embodiment can be improved the cooling performance of the permanent magnet 21 as compared with the rotor 2 according to the first embodiment, and the occurrence of demagnetization of the permanent magnet 21 can be suppressed.

Third Embodiment

Figure 11:
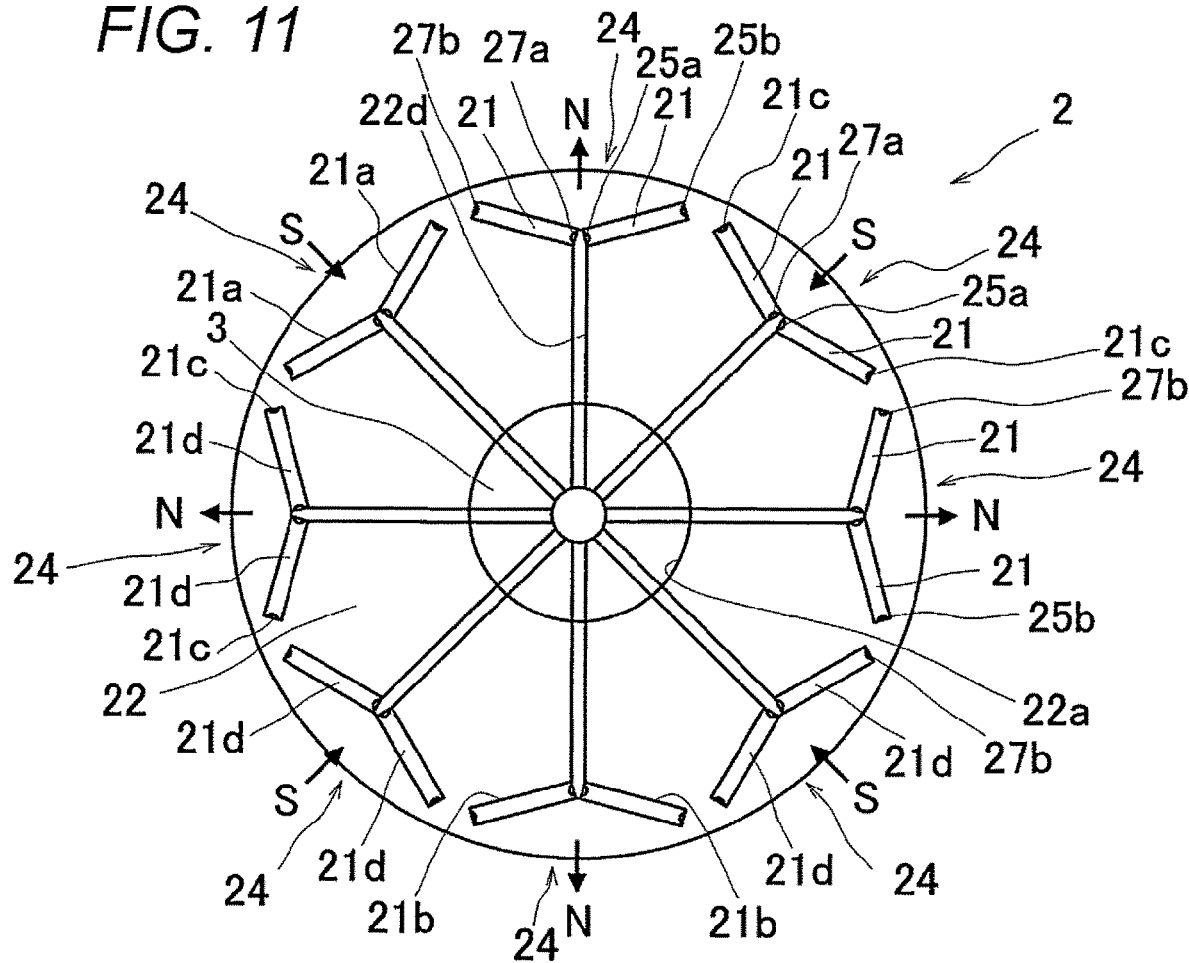
FIG. 11 is a cross-sectional view of a rotor according to a third embodiment of the present invention taken along line A-A' in FIG. 1.

FIG. 11 is a cross-sectional view of a rotor 2 according to a third embodiment of the present invention taken along line A-A' in FIG. 1. The rotor 2 according to the present embodiment differs from the rotor 2 according to the first embodiment with respect to a cross-sectional shape of a plurality of permanent magnets 21, a plurality of first magnet insertion holes 22b, and a plurality of second magnet insertion holes 22c in a direction perpendicular to an axis of a rotor core 22.

That is, in the first embodiment, each of the plurality of permanent magnets 21 is a so-called segment type magnet, and the cross-sectional shape of the permanent magnet 21 in the direction perpendicular to the axis of the rotor core 22 is a substantially annular sector. On the other hand, each of the plurality of permanent magnets 21 of the present embodiment is a so-called square magnet having a substantially rectangular cross-sectional shape in a direction perpendicular to the axis of the rotor core 22. That is, the permanent magnet 21 includes: an outer diameter side flat surface 21a that corresponds to the curved concave surface 21a of the first embodiment; an inner diameter side flat surface 21b that corresponds to the curved convex surface 21b of the first embodiment; two rectangular surfaces 21c that correspond to two rectangular surfaces 21c of the first embodiment; and two axial flat surfaces 21d that correspond to two annular sector surfaces 21d of the first embodiment.

Further, in the first embodiment, each of the plurality of first magnet insertion holes 22b and each of the plurality of second magnet insertion holes 22c are formed of a through hole where a cross-sectional shape of the through hole in a direction perpendicular to an axis of the rotor core 22 is a substantially annular sector. On the other hand, in the present embodiment, each of the plurality of first magnet insertion holes 22b and each of the plurality of second magnet insertion holes 22c are formed of a through hole where a cross-sectional shape of the through hole in a direction perpendicular to an axis of a rotor core 22 is a rectangular shape. Further, in the first embodiment, the first inner side surface 22ba and the second inner side surface 22bb of the first magnet insertion hole 22b and the first inner side surface 22ca and the second inner side surface 22cb of the second magnet insertion hole 22c are respectively formed of a curved surface. In the present embodiment, however, these surfaces are respectively formed of a flat surface.

(Advantageous Effects)

The permanent magnet 21 according to the present embodiment is a flat plate magnet and hence, magnetic pole surfaces of the permanent magnets 21 have the same shape. Accordingly, unlike the first embodiment, all magnetic poles 24 can be formed using one type of permanent magnet 21. Therefore, in the present embodiment, a manufacturing cost of the rotor 2 can be suppressed compared to the rotor 2 according to the first embodiment.

Fourth Embodiment

Figure 12:
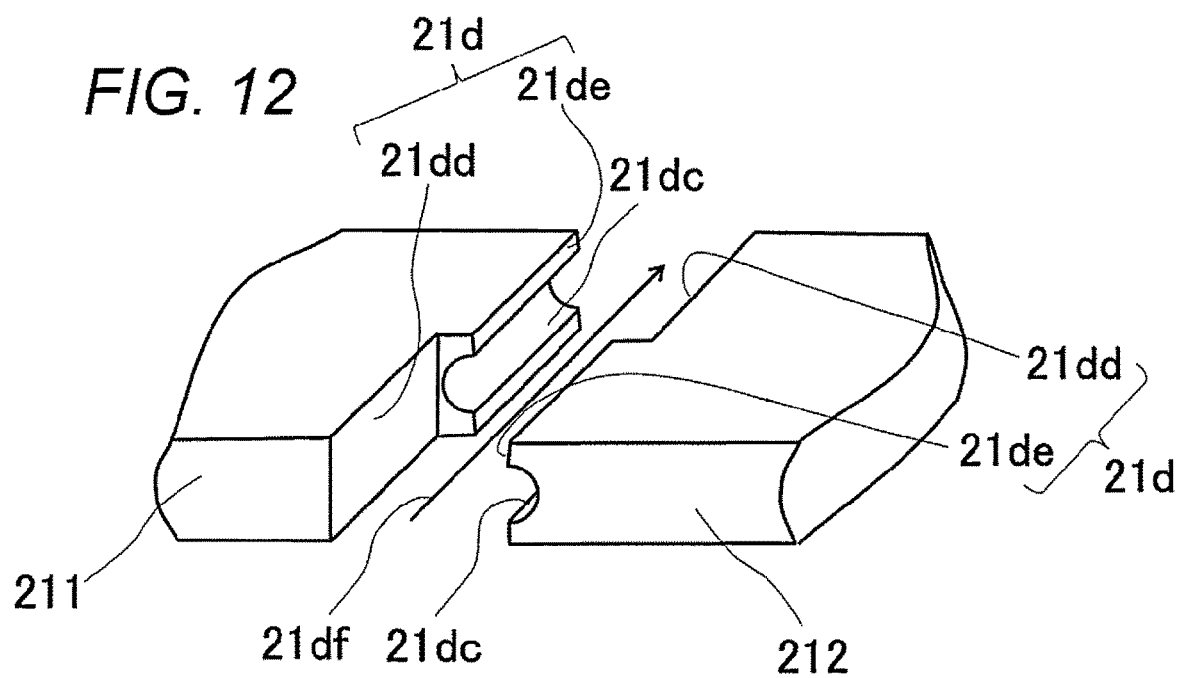
FIG. 12 is a perspective view illustrating shapes of end surfaces of permanent magnets disposed adjacently to each other in an axial direction of a rotor according to a fourth embodiment of the present invention.

FIG. 12 is a perspective view illustrating the shapes of end surfaces of permanent magnets 21 disposed adjacently to each other in an axial direction of a rotor 2 according to a fourth embodiment of the present invention. The permanent magnet 21 according to the present embodiment differs from the permanent magnet 21 of the second embodiment with respect to a point that respective non-magnetic pole surfaces 21dd of two permanent magnets 21 disposed adjacently to each other among the plurality of permanent magnets 21 respectively include a protruding surface 21de that protrudes in the axial direction of a rotor core 22, and a second groove 21dc is formed on the protruding surface 21de.

More specifically, in the present embodiment, each of the opposing non-magnetic pole surfaces 21d of two permanent magnets 21 (a first permanent magnet 211 and a second permanent magnet 212) disposed adjacently to each other includes: a rectangular surface 21dd; and the protruding surface 21de that protrudes from the rectangular surface 21dd in a normal direction of the rectangular surface 21dd. The second groove 21dc is formed on the protruding surface 21de.

As illustrated in FIG. 12, the respective non-magnetic pole surfaces 21d of the first permanent magnet 211 and the second permanent magnet 212 that are inserted into the magnet insertion hole are held in a state where the protruding surface 21de of the first permanent magnet 211 and the rectangular surface 21dd of the second permanent magnet 212 are brought into contact with each other, and the rectangular surface 21dd of the first permanent magnet 211 and the protruding surface 21de of the second permanent magnet 212 are brought into contact with each other. With such a configuration, a circumferential flow path 21df is formed by the second grooves 21dc formed on the respective protruding surfaces 21de. In the present embodiment, the case is exemplified where the permanent magnet 21 is the flat magnet of the second embodiment. However, the permanent magnet 21 may be the segment type magnet of the first embodiment.

(Advantageous Effects)

In the present embodiment, among the plurality of permanent magnets 21, the oppositely facing non-magnetic pole surfaces 21*d* of two permanent magnets 21 disposed adjacently to each other are combined with each other and hence, the positioning accuracy can be improved.

Fifth Embodiment

Figure 13:
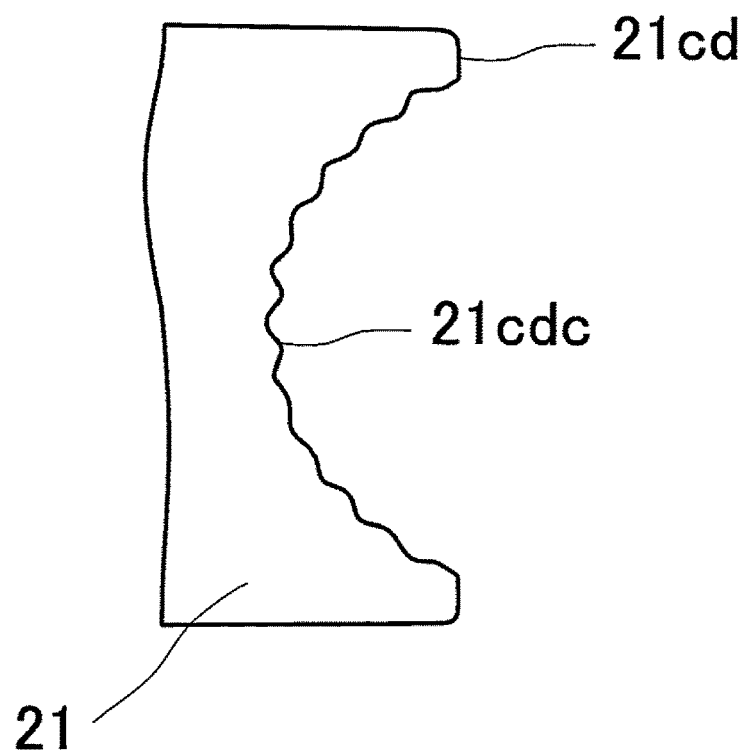
FIG. 13 is a cross-sectional view of a groove formed on a non-magnetic pole surface of a permanent magnet according to a fifth embodiment of the present invention.

FIG. 13 is a cross-sectional view of a groove formed on a non-magnetic pole surface of a permanent magnet 21 according to a fifth embodiment of the present invention. The permanent magnet 21 according to the present embodiment differs from the permanent magnet 21 according to the first embodiment with respect to the following point. That is, in the first embodiment, the surfaces of the grooves (the first groove 21*cc* and the second groove 21*dc*) formed on the non-magnetic pole surfaces (two rectangular surfaces 21*c* and two annular sector surfaces 21*d*) of the permanent magnet 21 are smooth. On the other hand, in the present embodiment, as illustrated in FIG. 13, a surface of a groove 21*cdc* formed on a non-magnetic pole surface 21*cd* of the permanent magnet 21 is made uneven.

(Advantageous Effects)

In the present embodiment, the groove formed on the non-magnetic pole surface of the permanent magnet 21 is made uneven. Accordingly, a surface area of the non-magnetic pole surface of the permanent magnet 21 can be increased compared to the non-magnetic surface of the permanent magnet 21 of the first embodiment where the surface of the groove is smooth. Accordingly, cooling performance can be enhanced.

Sixth Embodiment

Figure 14:
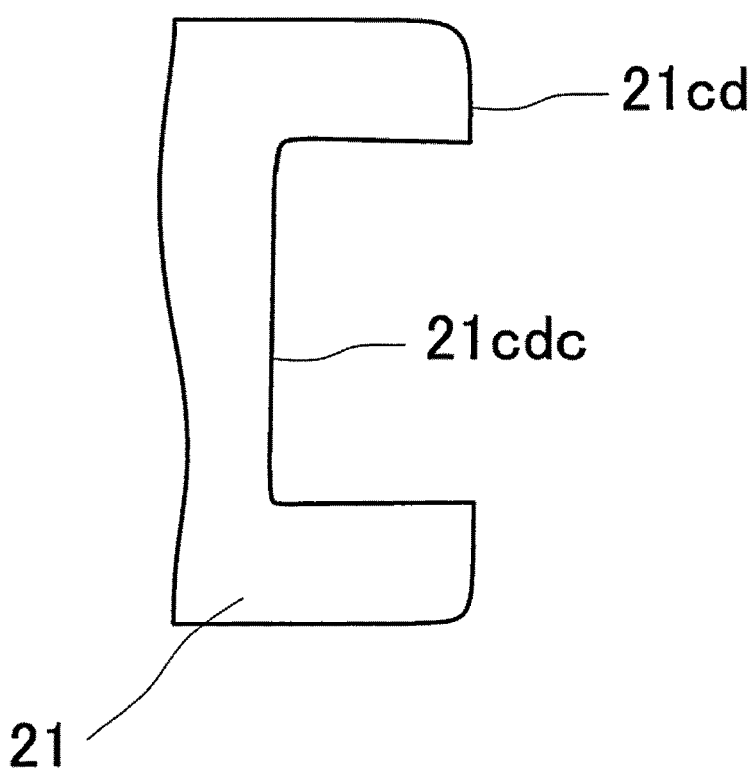
FIG. 14 is a cross-sectional view of a groove formed on a non-magnetic pole surface of a permanent magnet according to a sixth embodiment of the present invention.

FIG. 14 is a cross-sectional view of a groove formed on a non-magnetic pole surface of a permanent magnet 21 according to a sixth embodiment of the present invention. The permanent magnet 21 according to the present embodiment differs from the permanent magnet 21 according to the first embodiment with respect to the following point. That is, in the first embodiment, the cross sections of the grooves (the first groove 21*cc* and the second groove 21*dc*) formed on the non-magnetic pole surfaces (two rectangular surfaces 21*c* and two annular sector surfaces 21*d*) of the permanent magnet 21 are formed into a semicircular shape. On the other hand, in the present embodiment, as illustrated in FIG. 14, a surface of a groove 21*cdc* formed on a non-magnetic pole surface 21*cd* of the permanent magnet 21 is formed into a rectangular shape.

(Advantageous Effects)

The groove formed on the non-magnetic pole surface of the permanent magnet 21 according to the present embodiment has a rectangular cross section. Accordingly, the groove can be formed by cutting or milling and hence, a manufacturing cost of the permanent magnet 21 can be suppressed.

Seventh Embodiment

Figure 15:
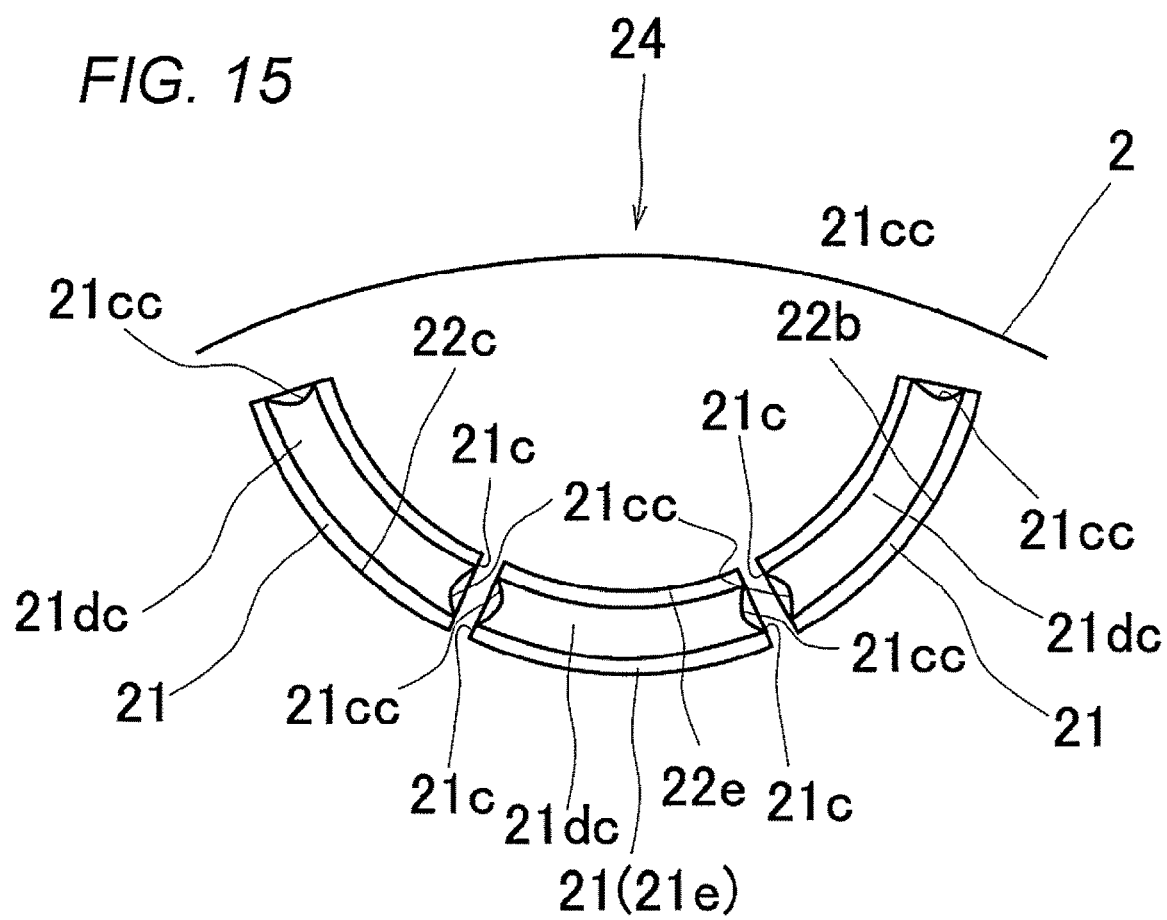
FIG. 15 is a schematic view illustrating a magnetic pole according to a seventh embodiment of the present invention.

FIG. 15 is a schematic view illustrating a magnetic pole 24 according to a seventh embodiment of the present invention. The magnetic pole 24 according to the present embodiment differs from the magnetic pole 24 according to the first embodiment with respect to the following point. That is, in the first embodiment, the magnetic pole 24 is formed of two permanent magnets 21 disposed adjacently to each other in the circumferential direction of the rotor 2. On the other hand, in the first embodiment, the magnetic pole 24 is formed of a plurality of (three in FIG. 15) permanent magnets 21 disposed adjacently to each other in the circumferential direction of a rotor 2.

More specifically, the permanent magnet 21 according to the present embodiment is formed of the plurality of (three in FIG. 15) permanent magnets 21 that form one magnetic pole 24. The plurality of permanent magnets 21 are respectively inserted into individual magnet insertion holes 22*b*, 22*c*, 22*e*. A groove (a first groove 21*cc*, a second groove 21*dc*) of the permanent magnet 21 is formed on at least one (both in the present embodiment) of opposing non-magnetic pole surfaces (a rectangular surface 21*c*, an annular sector surface 21*d*) of two permanent magnets 21 disposed adjacently to each other in the plurality of permanent magnets 21.

(Advantageous Effects)

In the plurality of permanent magnets 21 that form the magnetic pole 24 of the present embodiment, the groove is formed on at least one of the non-magnetic pole surfaces of two permanent magnets 21 disposed adjacently to each other. With such a configuration, the magnetic pole 24 is formed by arranging three or more permanent magnets 21 in the circumferential direction of a rotor 2, and the permanent magnet 21*e* sandwiched between the permanent magnets 21 in the circumferential direction of the rotor 2 also has the groove on the non-magnetic pole surface.

Therefore, even in a case where the arrangement of the permanent magnets 21 in the magnetic pole 24 differs from the corresponding arrangement in the first embodiment and the second embodiment, and the permanent magnet 21*e* having both ends thereof sandwiched between the permanent magnets 21 in the circumferential direction of the rotor 2 is disposed, the permanent magnet 21*e* has a groove through which a refrigerant 101 can flow on the non-magnetic pole surface and hence, the demagnetization due to the heat generation and the demagnetization due to the shape can be suppressed without reducing an effective magnet volume.

Eighth Embodiment

Figure 16:
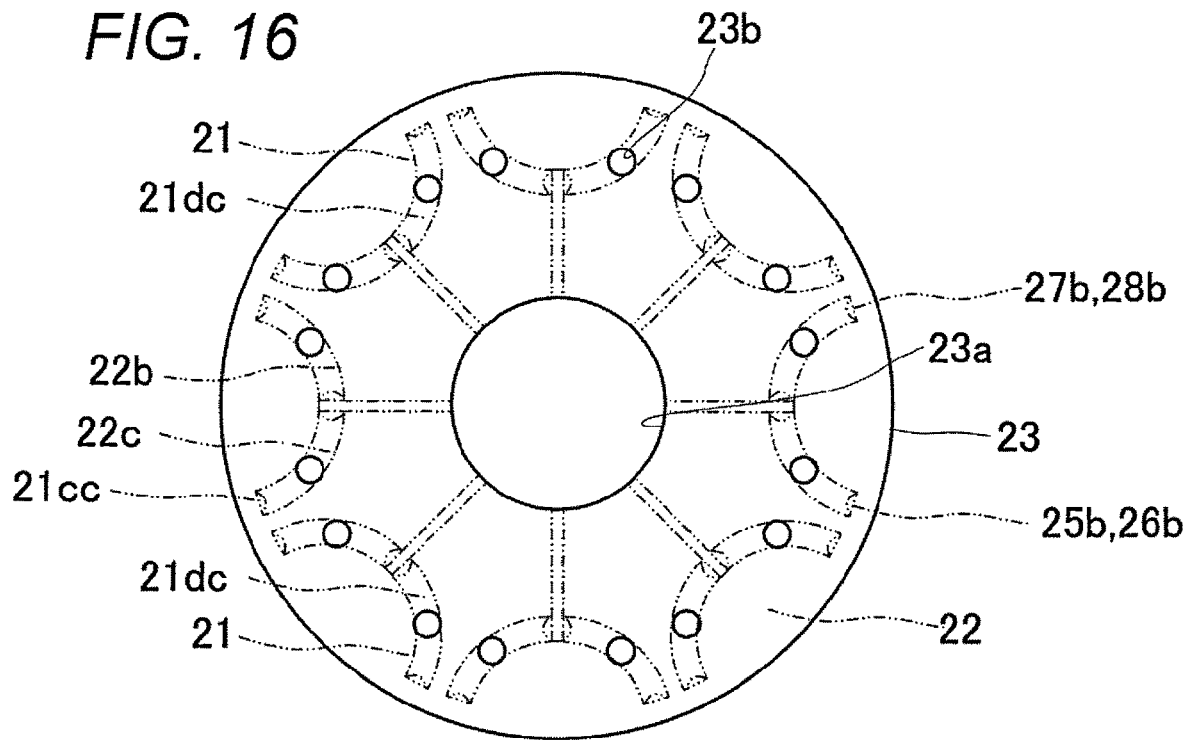
FIG. 16 is a front view of an end ring mounted on an end surface of a rotor core according to an eighth embodiment of the present invention.
Figure 17:
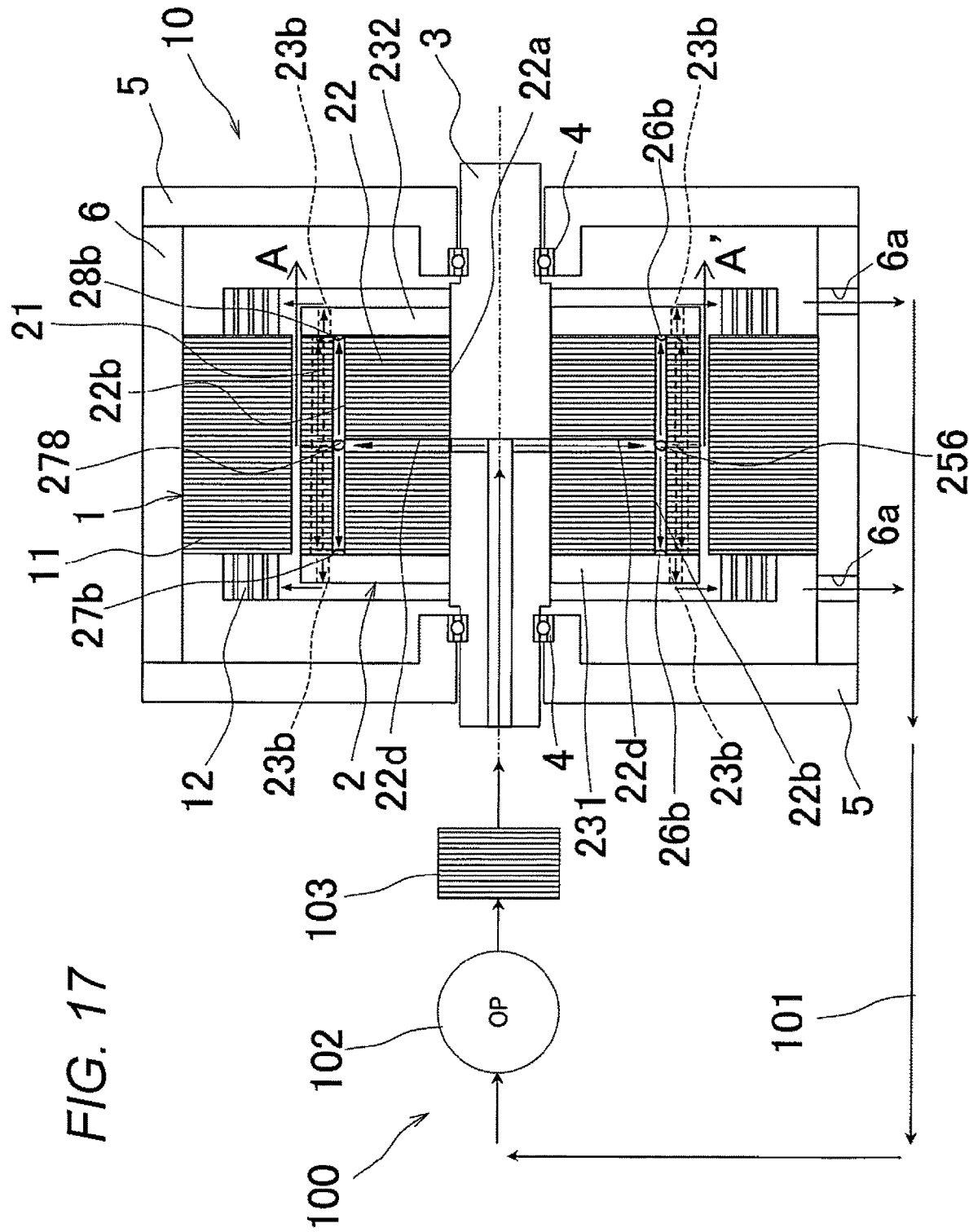
FIG. 17 is a cross-sectional view illustrating the schematic configuration of a rotating electric machine according to the eighth embodiment of the present invention.

FIG. 16 is a front view of an end ring mounted on an end surface of a rotor core according to an eighth embodiment of the present invention. FIG. 17 is a cross-sectional view illustrating the schematic configuration of a rotating electric machine 10 according to the eighth embodiment of the present invention.

An end ring 23 according to the present embodiment differs from that according to the first embodiment as follows. That is, the outer diameters of the end rings 23 (the inflow-side end ring 231 and outer diameter of the opposite-inflow-side end ring 232) according to the first embodiment are at least smaller than the distance between the outer end of the flow path on the outer diameter side of the rotor 2 (the inflow-side second circumferential flow path 25*d* and the inflow-side fourth circumferential flow path 27*d* or the opposite-inflow-side second circumferential flow path 26*d* and the opposite-inflow-side fourth circumferential flow path 28*d*) in the radial direction of the rotor core 22 and the center of the rotor core 22.

On the other hand, the outer diameter of the end ring 23 according to the present embodiment is at least larger than the distance between the outer end of the flow path on the outer diameter side of the rotor 2 in the radial direction of the rotor core 22 and the center of the rotor core 22.

Further, unlike the first embodiment, a plurality of refrigerant discharge holes 23b are formed in the end ring 23 according to the present embodiment. When two end rings 23 are respectively mounted on and fixed to the corresponding respective end surfaces of the rotor core 22, Each of a plurality of refrigerant discharge holes 23b communicate with the second grooves 21dc of the permanent magnets 21 that are inserted into each of the plurality of first magnet insertion holes 22b and each of the plurality of second magnet insertion holes 22c of the rotor core 22. With such a configuration, the inner diameter value and the center position of each of the plurality of refrigerant discharge holes 23b are determined based on the positions and widths of the first grooves 21cc and the second grooves 21dc. Particularly, when two end rings 23 are respectively mounted on and fixed to the corresponding respective end surfaces of the rotor core 22, the centers of the plurality of refrigerant discharge holes 23b preferably be positioned at the centers of the center lines of the second grooves 21dc of the permanent magnets 21 inserted into the plurality of first magnet insertion holes 22b and the plurality the second magnet insertion hole 22c formed in the rotor core 22.

In the first embodiment, the refrigerant 101 that has passed through the flow paths of the rotor 2 is discharged from the discharge ports 25e to 28e toward the coil 12. On the other hand, in the present embodiment, as illustrated in FIG. 16, the refrigerant 101 that has passed through the respective flow paths of the rotor 2 is discharged from each of the plurality of refrigerant discharge holes 23b toward the coil 12.

(Advantageous Effects)

In the present invention, with respect to the end rings 23, when two end rings 23 are respectively mounted on and fixed to the corresponding respective end surfaces of the rotor core 22, each of the plurality of refrigerant discharge holes 23b communicate with the second grooves 21dc of the permanent magnets 21 that are inserted into the plurality of first magnet insertion holes 22b and the plurality of second magnet insertion holes 22c of the rotor core 22, respectively. With such a configuration, the refrigerant 101 that has passed through the respective flow paths of the rotor 2 is discharged from each of the plurality of refrigerant discharge holes 23b. Therefore, in the present embodiment, unlike the first embodiment, the refrigerant 101 can be discharged at a position away from the end surfaces of the rotor core 22 by a thickness of the end ring 23 and hence, it is possible to prevent the refrigerant 101 from entering a gap between the rotor 2 and the stator 1.

Further, it is preferable that, when two end rings 23 are respectively mounted on and fixed to the end surfaces of the rotor core 22 and the end ring 23 is viewed from the axial direction of the rotor 2, the plurality of refrigerant discharge holes 23b do not overlap with each of the plurality of flow paths that extend on an outer diameter side of the rotor 2 in the axial direction (the inflow-side second axial flow path 25b, the opposite-inflow-side second axial flow path 26b, the inflow-side fourth axial flow path 27b, and the opposite-inflow-side fourth axial flow path 28b of the rotor 2) (see FIG. 7). That is, when two respective end rings 23 are mounted on and fixed to the respective end surfaces of the rotor core 22, it is preferable that the refrigerant 101 jetted in the axial direction of the rotor 2 from each of the plurality of flow paths extending in the axial direction on the outer diameter side of the rotor 2 impinge on the surface of two end rings 23 that facing the rotor core 22. With such a configuration, it is possible to prevent the occurrence of a case where the refrigerant 101 that flows through each of the plurality of flow paths extending in the axial direction on the outer diameter side of the rotor 2 and is jetted out in the axial direction of the rotor 2 is directly discharged in the axial direction of the rotor 2 from each of the plurality of refrigerant discharge holes 23b and is discharged to the outside of the rotating electric machine 10 without cooling the coil 12. Accordingly, the coil 12 can be efficiently cooled (see FIG. 17).

The present invention is not limited to the above-described embodiments, and includes various modifications of these embodiments. For example, the above-described embodiment has been described in detail for facilitating the understanding of the present invention. However, the embodiment is not necessarily limited to the rotating electric machine that includes all configurations described above. A part of the configuration of one embodiment can be replaced with the configuration of another embodiment, and the configuration of another embodiment can be added to the configuration of one embodiment. Further, with respect to parts of the configurations of the respective embodiments, the addition, the deletion and the replacement of other configurations can be made. More specifically, it is sufficient that the flow path for the refrigerant 101 includes a flow path formed of the groove (at least one of the first groove 21cc and the second groove 21dc) formed on the non-magnetic pole surface of the permanent magnet 21, and other flow paths are not limited to the flow paths described in the above-mentioned embodiments.

Embodiments of the present invention may have the following aspects. Although the example in which the magnetic pole 24 of the rotor 2 has 8 poles has been described, the rotor 2 having different number of poles may be used.

REFERENCE SIGNS LIST 10 rotating electric machine
2 rotor
21, 211 to 214 permanent magnet
21c (rectangular surface), 21d (annular sector surface) non-magnetic surface
21cc (first groove), 21dc (second groove) groove
22 rotor core
22b (first magnet insertion hole), 22c (second magnet insertion hole) magnetic insertion hole
22bc, 22cc (third inner side surface), 22bd, 22cd (fourth inner side surface) inner side surface of the magnet insertion hole
21de protruding surface

The invention claimed is:
1. A rotating electric machine comprising:
a rotor core that has a magnet insertion hole;
a permanent magnet that is inserted into the magnet insertion hole; and
a groove that is formed on all non-magnetic pole surfaces of the permanent magnet so as to allow a refrigerant to flow through the groove.
2. The rotating electric machine according to claim 1, wherein the groove is formed on all nonmagnetic pole surfaces that face an inner side surface of the magnet insertion hole.
3. The rotating electric machine according to claim 1, wherein
the permanent magnet is a plurality of the permanent magnets inserted into the magnet insertion holes and arranged in an axial direction of the rotor core, and the groove is formed on all non-magnetic surfaces that face each other in two permanent magnets disposed adjacently to each other among the plurality of permanent magnets.

4. The rotating electric machine according to claim 3, wherein
the respective non-magnetic pole surfaces that face each other in two permanent magnets disposed adjacently to each other among the plurality of permanent magnets have a protruding surface that protrudes in an axial direction of the rotor core, and
the groove is formed on the protruding surface.

5. The rotating electric machine according to claim 1, wherein a surface of the groove is uneven.

6. The rotating electric machine according to claim 1, wherein
the permanent magnet is formed of the plurality of permanent magnets each of which form one magnetic pole,
the plurality of permanent magnets are respectively inserted into the individual magnet insertion holes, and
the groove is formed on all non-magnetic pole surfaces that face each other in the two permanent magnets disposed adjacently to each other among the plurality of permanent magnets.

* * * * *